(12) United States Patent
Pych et al.

(10) Patent No.: US 7,047,212 B1
(45) Date of Patent: May 16, 2006

(54) METHOD AND SYSTEM FOR STORING PROSPECT LISTS IN A COMPUTER DATABASE

(75) Inventors: Joseph T. Pych, South Royalton, VT (US); James T. Ford, Enfield, NH (US)

(73) Assignee: NextMark, Inc., Hanover, NH (US)

( * ) Notice: Subject to any disclaimer, the term of this patent is extended or adjusted under 35 U.S.C. 154(b) by 1039 days.

(21) Appl. No.: 09/662,364

(22) Filed: Sep. 13, 2000

Related U.S. Application Data

(60) Provisional application No. 60/153,597, filed on Sep. 13, 1999, and provisional application No. 60/153,592, filed on Sep. 13, 1999.

(51) Int. Cl.
*G06F 17/60* (2006.01)
*G06F 17/30* (2006.01)

(52) U.S. Cl. .............................. 705/26; 705/27; 705/10; 707/5

(58) Field of Classification Search ...................... 705/8, 705/10, 26, 27; 707/5, 6
See application file for complete search history.

(56) References Cited

U.S. PATENT DOCUMENTS

| | | | | |
|---|---|---|---|---|
| 4,355,372 A | | 10/1982 | Johnson et al. ............ 379/92.04 |
| 4,536,791 A | * | 8/1985 | Campbell et al. .............. 725/28 |
| 4,603,232 A | | 7/1986 | Kurland et al. ........... 379/92.04 |
| 5,303,149 A | * | 4/1994 | Janigian ......................... 707/6 |
| 5,341,496 A | * | 8/1994 | Middledorp et al. ............ 714/2 |
| 5,619,558 A | | 4/1997 | Jheeta ......................... 379/90 |
| 5,793,972 A | * | 8/1998 | Shane ......................... 709/219 |
| 5,806,057 A | * | 9/1998 | Gormley et al. ................ 707/1 |
| 5,819,291 A | * | 10/1998 | Haimowitz et al. ......... 707/201 |
| 5,845,285 A | * | 12/1998 | Klein ......................... 707/101 |
| 5,873,068 A | | 2/1999 | Beaumont et al. ............ 705/14 |
| 5,930,764 A | | 7/1999 | Melchione et al. ........... 705/10 |
| 5,966,695 A | | 10/1999 | Melchione et al. ........... 705/10 |
| 5,983,222 A | * | 11/1999 | Morimoto et al. .............. 707/6 |
| 6,018,738 A | * | 1/2000 | Breese et al. ............... 707/100 |
| 6,026,398 A | * | 2/2000 | Brown et al. ................... 707/5 |
| 6,029,174 A | | 2/2000 | Sprenger et al. ........ 707/103 R |
| 6,092,053 A | | 7/2000 | Boesch et al. ................ 705/26 |
| 6,098,048 A | | 8/2000 | Dashefsky et al. ........... 705/10 |
| 6,167,435 A | | 12/2000 | Druckenmiller et al. .... 709/206 |
| 6,182,050 B1 | | 1/2001 | Ballard ........................ 705/14 |
| 6,185,555 B1 | | 2/2001 | Sprenger et al. ............... 707/3 |
| 6,249,790 B1 | | 6/2001 | Babcock, Jr. ............ 707/104.1 |

(Continued)

FOREIGN PATENT DOCUMENTS

EP 0890913 A1 * 1/1999

OTHER PUBLICATIONS

Anon., "Calif. Chain Pushes Travel–Related Toys," Playthings, vol. 87, No. 2, p. 86, Feb. 1989.*

(Continued)

*Primary Examiner*—Nicholas D. Rosen
(74) *Attorney, Agent, or Firm*—Ruth J. Ma; Joseph H. Born; Foley Hoag LLP

(57) ABSTRACT

A system for implementing a computerized prospect list service includes a server computer hosting a prospect list service accessible via client computers to a plurality of prospect list managers and a plurality of list purchasers and a database of information concerning prospect lists available from a plurality of list managers. The prospect list service includes a user interface having controls whereby a list manager or a list purchaser can access information concerning prospect lists stored in the database. The prospect list service is available via the Internet to assist a list manager in offering a prospect list for sale to a plurality of list purchasers and to assist a list purchaser in selecting and purchasing a list of prospects from a list manager.

13 Claims, 19 Drawing Sheets

U.S. PATENT DOCUMENTS

| | | |
|---|---|---|
| 6,253,203 B1 | 6/2001 | O'Flaherty et al. ............ 707/9 |
| 6,256,664 B1 | 7/2001 | Donoho et al. ............ 709/204 |
| 6,275,824 B1 | 8/2001 | O'Flaherty et al. ............ 707/9 |
| 6,285,983 B1 | 9/2001 | Jenkins ..................... 705/10 |
| 6,298,348 B1 | 10/2001 | Eldering ................... 707/10 |
| 6,307,958 B1 | 10/2001 | Deaton et al. ............. 382/139 |
| 6,321,224 B1 | 11/2001 | Beall et al. .................. 707/5 |
| 6,343,738 B1 * | 2/2002 | Ogilvie ..................... 235/381 |
| 6,446,261 B1 | 9/2002 | Rosser ...................... 725/34 |
| 6,868,389 B1 | 3/2005 | Wilkins et al. ............. 705/10 |

OTHER PUBLICATIONS

Anon., "Picking Lists That Hit the Target" (Abstract), Bank Marketing, vol. 21, No. 4, p. 30, Apr. 1989.*

Egol, L., "Can Uncle Sam Be a Good Customer," Direct, vol. 6, No. 4, p. 15, Apr. 1994.*

Tighe, F., "New England Research Institute Uses FoxPro to Distribute Information," DAta Based aDvisor, vol. 13, No. 10, p. 84 Nov., 1995.*

Anon., "Donnelley Virtually Shops its List" (Abstract), Promo, vol. IX, No. 10, p. 71, Sep., 1996.*

Anon., "NetCreations, Direct Media Team up to Conduct 'Politically Correct' Direct Marketing on the Internet," Business Wire, Dec. 12, 1996.*

Anon., "Acxiom(R) Announces Dramatic NewExpanisons to the Acxiom InfoBase™ Product Line," PR Newswire, Oct., 1999.*

Anon., Restaurant Chain Uses Internet to Expand Database, Direct Maarketing, vol. 61, No. 9, pp. 17, Jan. 1999.*

Levy, D., "Small Businesses Thrive on Net Retailers' Help," USA Today, Monday, Apr. 12, 1999, Final edition, Money section, p. 3B.*

Hoffman et al. "Building Consumer Trust Online", Communications of the ACM, vol. 42, Issue 4, pp. 80-85. ACM Press. Apr. 1999.

Wang et al. "Consumer Privacy Concerns about Internet Marketing", Communications of the ACM, vol. 41, Issue 3, pp. 63-70. ACM Press. Mar. 1998.

Dern, D. "Start the Presses" Home Office Computing, 16(10): 116, (Oct. 1998).

Edwards & Edwards "Ten Best –bet Businesses for the 1990s"; Home Office Computing, 10(7): 40, (Jul. 1992).

Gibbs, M. "Welcome to the Machine", Network World, p. 34, (Jan. 25, 1999).

Kennedy, S. "The Internet as a Communications Tools", Information Today, 14(2): 39, (Feb. 1997).

Levenson, H. A. "Affinity Card Income Not UBTI", Tax Advisor, 29(1): 10, (Jan. 1998).

Aucken, et al., Valex User Guide, Jul. 22, 1997, 138 pages.

Resnick, Rosalind, "Netcreations releases Postmaster Direct Response 2.0 Real–Time List Ordering System for the Web", May 25, 1998, 2 pages.

Orr, Alicia, "What does it all mean to you?", Target Marketing, Sep. 1, 1999, vol. 22, No. 8, pp. 34–37.

Anonymous, "List–Universe Launches Business Resource Network for Email List Owners and Ezine Publishers", PR Newswire, Jul. 8, 1999, No. 43001680, 3 pages.

Darsa, Deidra, "Demographic Data Help Lenders Work Subprime Market", Jan. 5, 1998, Real Estate Finaince Today, v. 15, N1, pp. 3, 7.

Kalinoski, Glenn J., "Marketing Firm Says it Goes Beyond Telemarketing to Generate Leads", Sep. 1998, Origination News, v. 7, No. 13, p. 96.

Pasher, Victoria Sonshine, "PIA Disapproves of USF & G Alliance", Nov. 3, 1997, National Underwriter, v. 101, n. 4, pp. 15-184.

* cited by examiner

METHOD AND SYSTEM FOR STORING PROSPECT LISTS IN A COMPUTER DATABASE

REFERENCE TO RELATED APPLICATIONS

The present application claims priority to U.S. Provisional Application No. 60/153,597, filed Sep. 13, 1999 and U.S. Provisional Application No. 60/153,592, filed Sep. 13, 1999. Each of the aforementioned provisional patent applications is incorporated herein by reference.

BACKGROUND OF THE INVENTION

Obtaining a list of prospective customers is at the heart of any marketing plan. Marketers use prospect lists to grow the customer base of a company. Generally, marketers obtain a prospect list (or lists) and then select a subset of suitable prospective customers from the list or lists obtained.

Prospect lists can be obtained in many ways. For example, prospect lists can be obtained directly from the source of the list, referred to as the "list source", through a manager of the list, referred to as the "list manager", or through a broker of prospect lists, referred to as a "list broker". A list source is generally an originator of one or more prospect lists. Exemplary list sources include magazine subscriptions, sweepstakes entries, club memberships, and product purchases. A list manager generally manages the distribution of a prospect list on behalf of one or, typically, many list sources. A list broker works with list managers to obtain prospect lists on behalf of list purchasers, such as marketers.

The nature of each prospect list provides information about the attributes of the prospects contained in the list. For example, a person who subscribes to a bicycling magazine is typically interested in bicycling. There are prospect lists for virtually any hobby, interest, sport, etc. Marketers can use prospect attributes to select a prospect list and target prospective customers on the prospect list that are likely to be interested in the product or service offered by the marketer.

In addition, a prospect list may include attributes of the prospects on the list that are specific to each prospective customer. For example, a bicycling magazine may track the type of bicycle a subscriber owns. These attributes can be used as "selects"—criteria through which a subset of prospective customers from the prospect list can be obtained. For example, "bicycle type" might be a select for the bicycle magazine prospect list. Thus, a marketer can choose a subset of prospective customers from the prospect list by selecting only those prospects having a bicycle type identified as Schwinn. Marketers can use selects to further refine a prospect list and to maximize responsiveness to marketing efforts.

Selecting a prospect list is a daunting task given the wide variety of prospect lists available. For this reason, it is often necessary for list purchasers to employ the help of a list broker. List brokers are generally knowledgeable about prospect lists that are currently available and keep track of new lists as they become available. A list broker can provide the list purchaser with prospect lists specific to the needs of the list purchaser, as well as any additional selects provided by the prospect lists. The list purchaser can select a prospect list or lists from the lists provided by the list broker and additional selects for each selected list. The list broker can then contact each of the list managers corresponding to the selected prospect lists to obtain a count of the prospective customers that meet the requirements of the list purchaser. Once the count is obtained, the list broker can calculate the cost, finalize the cost with the list purchaser, and place the order.

Working with a list broker, although useful, is time consuming, as selecting a prospect list can require much iteration. Some companies, referred to as "online aggregators", provide list purchasers with immediate access to prospect lists through the Internet. Two examples of online aggregators are MySoftware and infoUSA. Online aggregators aggregate (directly or indirectly through a third party) many prospect lists into a large database and provide a uniform way to select names from the database. The benefit of such an approach is the speed of obtaining prospect lists. A drawback is decreased accuracy, as important contextual information concerning the prospects on the lists is lost as the data is aggregated. The loss of information makes selecting a highly targeted subset of prospective customers from the aggregated database very difficult. For example, it may not be possible to select Schwinn bicycle owners from the aggregate database because that attribute information is lost during the aggregation process.

SUMMARY OF THE INVENTION

The present invention provides a method and a system for storing prospect lists in a database of prospect lists. The method and system of storing prospect lists of the present invention is one component of a computer network based prospect list service designed to facilitate the efficient and effective acquisition, storage, and distribution of prospect lists through a computer network. The prospect list service is available over a computer network, such as the Internet, to assist list managers in offering prospect lists for sale and to assist list purchasers in selecting, purchasing, and accessing highly targeted lists of prospective customers.

The method and system of storing prospect lists of the present invention allows a wide variety of prospect lists to be stored in a common database without a loss of list information. Thus, prospect lists containing unique attributes can be stored together in the database without sacrificing any list attributes. In addition, the list storage method and system of the present invention provides the ability to identify common attributes and common prospects in distinct prospect lists. For example, prospect lists from distinct bicycle magazines each may contain the attribute "bicycle type" for subscribers (i.e., prospects) on the prospect list. Likewise, one person or household may subscribe to multiple bicycle magazines and, thus, may appear on more than one prospect lists relating to bicycles. Recognizing common attributes and common prospects facilitates searching of the database and the creation of highly targeted lists of prospective customers.

In accordance with one aspect of the present invention, a method of storing a prospect list in a computer database includes the steps of receiving a prospect list for storage in the computer database and assigning a list ID to the prospect list. A prospect list generally includes one or more attributes for characterizing the prospective customers on the list. Each prospective customer on a prospect list has attribute data for one or more of the attributes included in the prospect list. The method of the present invention further includes the steps of assigning a distinct attribute ID to each attribute associated with the prospect list and storing each attribute and the associated attribute data in the database.

In accordance with another aspect of the present invention, the list storage method can include dividing one or more attributes into pre-defined component attributes. In addition, the list storage method can include transforming attribute data for one or more attribute into a standard format that is pre-defined by the computer database.

In accordance with a further aspect of the present invention, the list storage method can include adding geographic data to a prospective customer included on the prospect list. The geographic data identifies the geographic location of the residence of the prospective customer. For example, the geographic data can identify the latitude, longitude, and/or the Metropolitan Statistical Area (MSA) of the prospective customer's residence.

In accordance with a further aspect of the present invention, the list storage method can include comparing attribute data for an attribute of the list with existing attribute data stored on the database. For example, the compared attribute data can identify the respective prospective customer associated with the compared attribute data. Thus, the compared attribute data can be the name, address, and telephone number of the prospective customer associated with the compared attribute data. If the compared attribute data substantially matches the existing attribute data, a known party ID can be assigned to the prospective customer associated with the compared attribute data and the existing attribute data.

The list storage method of the present invention can be implemented as a set of processing instructions, stored in a computer-readable storage medium, for directing a computer, such as a server hosting a prospect list service, to carryout the steps of the method. For example, the processing instructions can instruct the server computer to receive a prospect list for storage in a computer database, assign a list ID to the prospect list, assign a distinct attribute ID to each attribute associated with the prospect list, and store each attribute and the associated attribute data in the database.

In accordance with one aspect of the present invention, a computer database for storing a plurality of prospect lists includes a list data structure for identifying a prospect list stored in the database and an attribute data structure for identifying an attribute associated with the prospect list. The list data structure stores a list ID assigned to the prospect list to uniquely identifying the prospect list. The attribute data structure stores an attribute ID assigned to the attribute to uniquely identify the attribute. The database further includes an attribute-data data structure for storing the attribute data associated with an attribute and the attribute ID assigned to the attribute.

In accordance with another aspect of the present invention, the list data structure of the computer database contains the number of prospects on the prospect list.

In accordance with a further aspect of the present invention, the computer database includes a list-attribute relationship table relating the prospect list with an attribute associated with the prospect list. The prospect list can be identified in the list-attribute relationship table by the list ID assigned to the prospect list and the attribute can be identified in the list-attribute relationship table by an attribute ID assigned to the attribute.

In accordance with another aspect of the present invention, the computer database includes a category data structure for storing information concerning a category of an attribute. A range of possible attribute data values for the attribute can define a category. Preferably, a high attribute data value and a low attribute data value define the range and the category data structure stores the high attribute data value and the low attribute value. The category data structure preferably stores a distinct category ID assigned to the category and the attribute ID assigned to the attribute corresponding to the category.

In accordance with a further aspect of the present invention, the computer database includes a list contact data structure containing information concerning a prospect included in the prospect list. The list contact data structure preferably stores the list ID and the name, telephone number, Email address, and/or mail address of the prospect.

In accordance with another aspect of the present invention, the computer database includes a known party data structure containing information concerning a prospect included on at least two prospect lists stored in the database. The known party data structure preferably stores a known party ID assigned to the prospect and the list ID of the each of the prospect lists.

A system for implementing a computerized prospect list service according to the present invention includes a server computer hosting a prospect list service accessible via client computers to a plurality of prospect list managers and a plurality of list purchasers and a database of information concerning prospect lists available from a plurality of list managers. The prospect list service preferably includes a user interface having controls whereby a list manager or a list purchaser can access information concerning prospect lists stored in the database. The prospect list service is available via the Internet to assist a list manager in offering a prospect list for sale to a plurality of list purchasers and to assist a list purchaser in selecting and purchasing a list of prospects from a list manager.

BRIEF DESCRIPTION OF THE DRAWINGS

These and other features and advantages of the present invention will be more fully understood by reference to the following detailed description in conjunction with the attached drawings in which like reference numerals refer to like elements through the different views. The drawings illustrate principles of the invention and, although not to scale, show relative dimensions.

DETAILED DESCRIPTION OF THE PREFERRED EMBODIMENTS

To provide an overall understanding of the invention, certain illustrative embodiments will now be described, including an online prospect list service designed to facilitate the efficient and effective acquisition, storage, and distribution of prospect lists through a computer network. The online prospect list service is available via a computer network, preferably the Internet, to assist a list manager in offering a prospect list for sale to a plurality of list purchasers and to assist a list purchaser in selecting and purchasing a list of prospects from a list manager. As used herein, the term "prospect list" generally refers to a list of prospects having one or more common characteristics or attributes. A prospect can be, for example, an individual, a group of individuals, a household, a businesses, or other entity or organization. The term "list manager" as used herein generally refers to any person, business, or other entity responsible for distribution of a prospect list, including the list owner or list source. The term "list purchaser" refers to any person, business, or other entity interested in acquiring access to a list of potential customers. A list purchaser can be, for example, a marketer interested obtaining a list of potential customers to direct marketing or advertising to or can be a list broker working on behalf of one or more marketers.

The online prospect list service, as well as the systems and methods for implementing the service, are also described in commonly-owned U.S. patent application Ser. No. 09/661,010, entitled Method and System for Acquiring Prospect Lists Over A Computer Network, filed concurrently herewith, and commonly-owned U.S. patent application Ser. No. 09/662,469, entitled Method and System for Distributing Prospect Lists Over a Computer Network, filed concurrently herewith. Each of the aforementioned patent applications is incorporated herein by reference.

Figure 1:
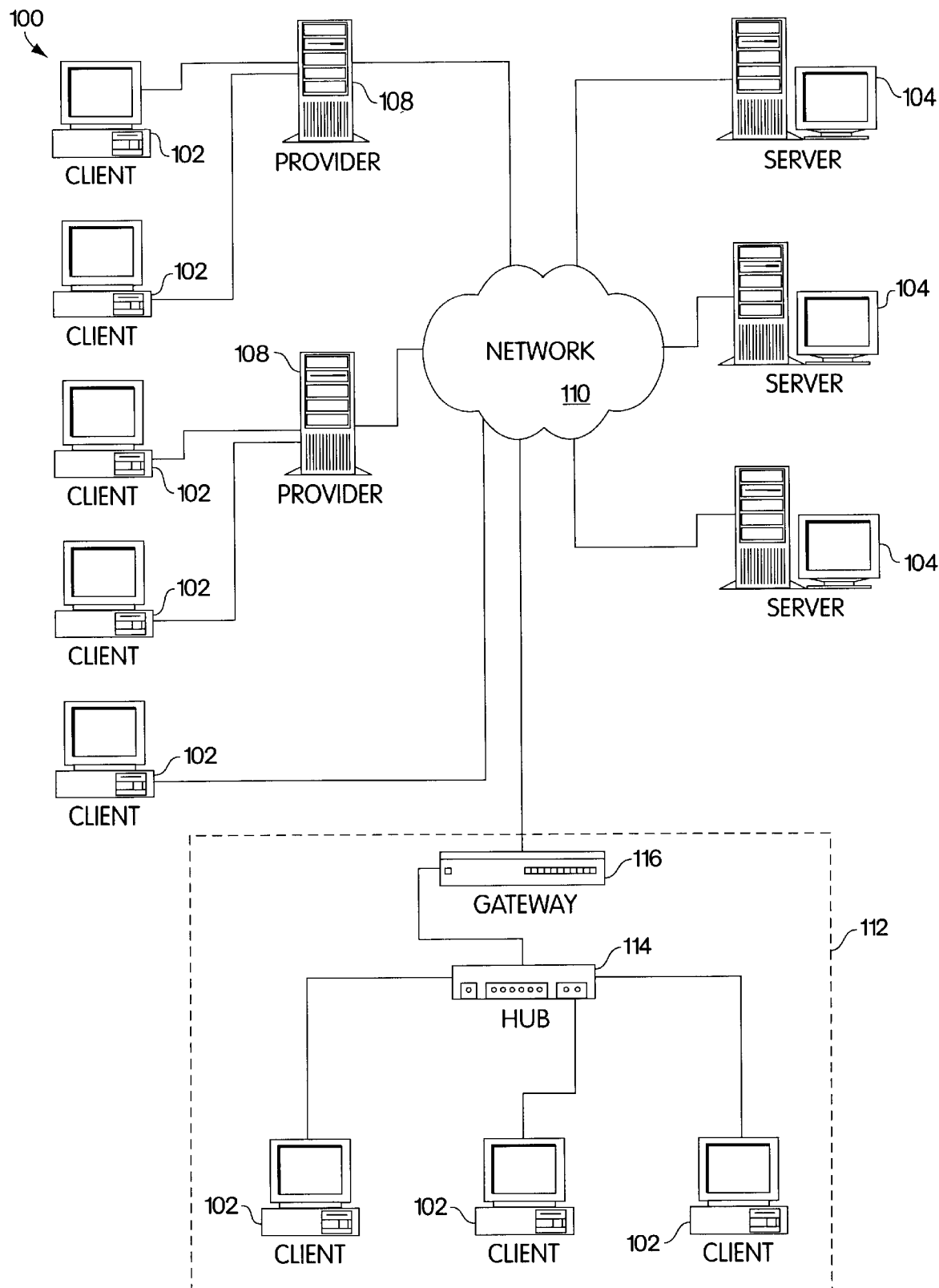
FIG. 1 is a schematic diagram of the entities involved in an embodiment of a method and system disclosed herein.

FIG. 1 shows a schematic diagram of the entities involved in an embodiment of a online prospect list service disclosed herein. In a system 100, a plurality of clients 102, servers 104, and providers 108 are connected via a computer network 110. It should be understood that any number of clients 102, servers 104, and providers 108 could participate in such a system 100. The system may further include one or more local area networks ("LAN") 112 interconnecting clients 102 through a hub 114 (in, for example, a peer network) or a local area network server 114 (in, for example, a client-server network). The LAN 112 may be connected to the network 110 through a gateway 116, which provides security to the LAN 112 and ensures operating compatibility between the LAN 112 and the network 110.

In one embodiment, the computer network 110 is the Internet, and the World Wide Web provides a system for interconnecting clients 102 and servers 104 through the Internet 110.

An exemplary client 102 includes the conventional components of a client system, such as a processor, a memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as modem, digital subscriber line ("DSL") card, cable modem, network interface card, wireless network card, or other interface device capable of wired, fiber optic, or wireless data communications. One example of such a client 102 is a personal computer equipped with an operating system such as Microsoft Windows 95, Microsoft Windows NT, or Unix and its variants, along with software support for Internet communication protocols. The personal computer also includes a browser program, such as Microsoft Internet Explorer or Netscape Navigator, to provide a user interface for access to the Internet 110. Although the personal computer is a typical client 102, the client 102 may also be a workstation, mobile computer, Web phone, television set-top box, interactive kiosk, personal digital assistant, or other device capable of communicating over the computer network 110. As used herein, the terms "client" and "client system" are intended to refer to any of the above-described clients 102, and the term "browser" is intended to refer to any of the above browser programs or other software or firmware providing a user interface for navigating the Internet 110.

An exemplary server 104 includes a processor, a memory (e.g. RAM), a bus which couples the processor and the memory, a mass storage device (e.g. a magnetic or optical disk) coupled to the processor and the memory through an I/O controller, and a network interface coupled to the processor and the memory. Servers may be clustered together to handle more client traffic, and may include separate servers for different functions such as a database server, an application server, and a Web presentation server. Such servers may further include one or more mass storage devices such as a disk farm or a redundant array of independent disk ("RAID") system for additional storage and data integrity. Read-only devices, such as compact disk drives and digital versatile disk drives, may also be connected to the servers. Suitable servers and mass storage devices are manufactured by, for example, Compaq, IBM, and Sun Microsystems. As used herein, the term "server" is intended to refer to any of the above-described servers 104.

Focusing now on the computer network 110, the presently preferred embodiment is the Internet. The structure of the Internet 110 is well known to those of ordinary skill in the art and includes a network backbone with networks branching from the backbone. These branches, in turn, have networks branching from them, and so on. The backbone and branches are connected by routers, bridges, switches, and other switching elements that operate to direct data through the network 110. For a more detailed description of the structure and operation of the Internet 110, one may refer to "The Internet Complete Reference," by Harley Hahn and Rick Stout, published by McGraw-Hill, 1994, incorporated herein by reference. However, one may practice the present invention on a wide variety of communication networks. For example, the network 110 can include interactive television networks, telephone networks, wireless data transmission systems, two-way cable systems, customized computer networks, interactive kiosk networks and automatic teller machine networks.

One embodiment of the network 110 includes Internet service providers 108 offering dial-in service, such as Microsoft Network, America OnLine, Prodigy and CompuServe. It will be appreciated that the Internet service providers 108 may also include any computer system which can provide Internet access to a client 102. Of course, the Internet service providers 108 are optional, and in some cases, the clients 102 may have direct access to the Internet 110 through a dedicated DSL service, ISDN leased lines, T1 lines, digital satellite service, cable modem service, or any other high-speed connection. Any of these high-speed services may also be offered through one of the Internet service providers 108.

In its present deployment as the Internet 110, the network 110 consists of a worldwide computer network that communicates using the well-defined Transmission Control Protocol ("TCP") and Internet Protocol ("IP") to provide transport and network services. Computer systems that are directly connected to the Internet 110 each have a unique IP address. The IP address consists of four one-byte numbers (although a planned expansion to sixteen bytes is underway with IPv6). The four bytes of the IP address are commonly written out separated by periods such as "209.67.50.253". To simplify Internet addressing, the Domain Name System ("DNS") was created. The DNS allows users to access Internet resources with a simpler alphanumeric naming system. A DNS name consists of a series of alphanumeric names separated by periods. When a domain name is used, the computer accesses a DNS server to obtain the explicit four-byte IP address.

To further define the resources on the Internet 110, the Uniform Resource Locator system was created. A Uniform Resource Locator ("URL") is a descriptor that specifically defines a type of Internet resource along with its location. URLs have the following format:
resource-type://domain.address/path-name
where resource-type defines the type of Internet resource. Web documents are identified by the resource type "http" which indicates that the hypertext transfer protocol should be used to access the document. Other common resource types include "ftp" (file transmission protocol), "mailto" (send electronic mail), "file" (local file), and "telnet." The domain.address defines the domain name address of the computer that the resource is located on. Finally, the pathname defines a directory path within the file system of the server that identifies the resource. As used herein, the term "IP address" is intended to refer to the four-byte Internet Protocol address, and the term "Web address" is intended to refer to a domain name address, along with any resource identifier and path name appropriate to identify a particular Web resource. The term "address," when used alone, is intended to refer to either a Web address or an IP address.

In an exemplary embodiment, a browser, executing on one of the clients 102, retrieves a Web document at an address from one of the servers 104 via the network 110, and displays the Web document on a viewing device, e.g., a screen. A user can retrieve and view the Web document by entering, or selecting a link to, a URL in the browser. The browser then sends an http request to the server 104 that has the Web document associated with the URL. The server 104 responds to the http request by sending the requested Web document to the client 102. The Web document is an HTTP object that includes plain text (ASCII) conforming to the HyperText Markup Language ("HTML"). Other markup languages are known and may be used on appropriately enabled browsers and servers, including the Dynamic HyperText Markup Language ("DHTML"), the Extensible Markup Language ("XML"), the Extensible Hypertext Markup Language ("XHTML"), and the Standard Generalized Markup Language ("SGML").

Each Web document usually contains hyperlinks to other Web documents. The browser displays the Web document on the screen for the user and the hyperlinks to other Web documents are emphasized in some fashion such that the user can identify and select each hyperlink. To enhance functionality, a server 104 may execute programs associated with Web documents using programming languages such as Perl, C, C++, or Java. A server 104 may also use server-side scripting languages such as ColdFusion from Allaire, Inc., or PHP. These programs and languages perform "back-end" functions such as order processing, database management, and content searching. A Web document may also include references to small client-side applications, or applets, that are transferred from the server 104 to the client 102 along with a Web document and executed locally by the client 102. Java is one popular example of a programming language used for applets. The text within a Web document may further include (non-displayed) scripts that are executable by an appropriately enabled browser, using a scripting language such as JavaScript or Visual Basic Script. Browsers may further be enhanced with a variety of helper applications to interpret various media including still image formats such as JPEG and GIF, document formats such as PS and PDF, motion picture formats such as AVI and MPEG, and sound formats such as MP3 and MIDI. These media formats, along with a growing variety of proprietary media formats, may be used to enrich a user's interactive and audio-visual experience as each Web document is presented through the browser. The term "page" as used herein is intended to refer to the Web document described above, as well as any of the above-described functional or multimedia content associated with the Web document.

Figure 2:
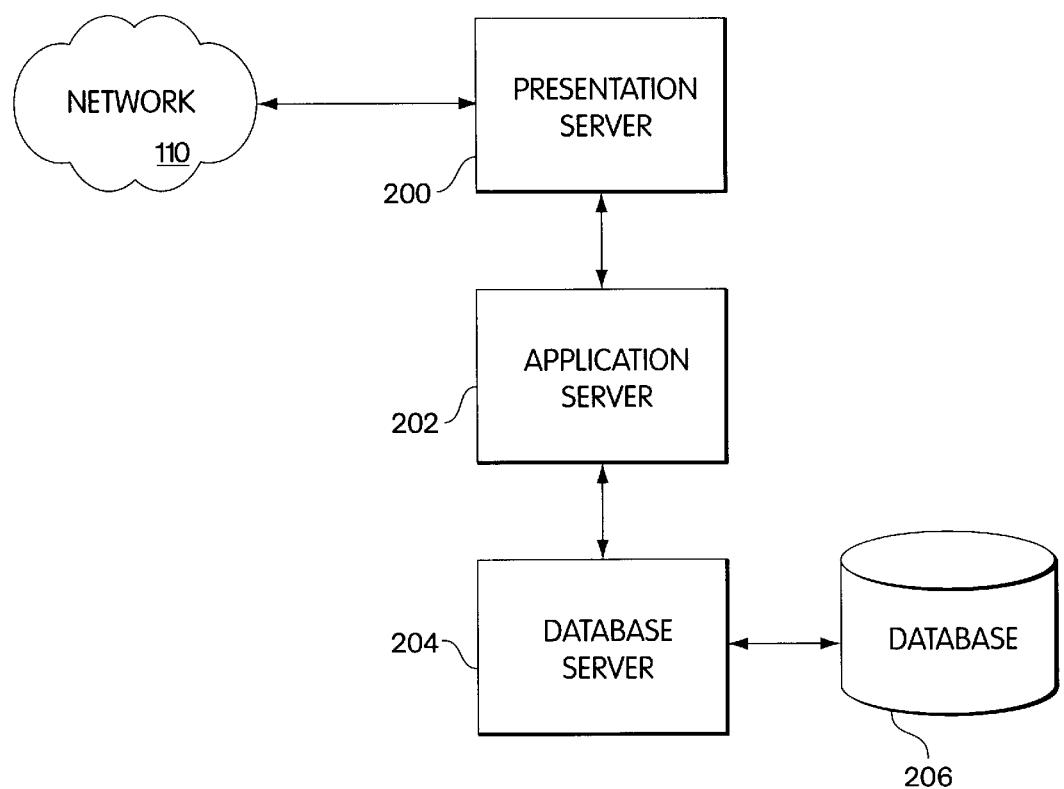
FIG. 2 is a block diagram of a preferred embodiment of a server.

FIG. 2 shows a block diagram of a preferred embodiment of a server for hosting the prospect list service of the present invention. In this embodiment, the server 104 includes a presentation server 200, an application server 202, and a database server 204. The application server 202 is connected to the presentation server 200. The database server 204 is also connected to the presentation server 200 and the application server 202, and is further connected to a database 206 embodied on a mass storage device. The presentation server 200 includes a connection to the network 110. It will be appreciated that each of the servers may comprise more than one physical server, as required for capacity and redundancy, and it will be further appreciated that in some embodiments more than one of the above servers may be logical servers residing on the same physical device. It will further be appreciated that one or more of the servers may be at a remote location, and may communicate with the presentation server 200 through a local area or wide area network. The term "host," as used herein, is intended to refer to any combination of servers described above that include a presentation server 200 for providing access to pages by the clients 102. The term "site," as used herein, is intended to refer to a collection of pages sharing a common domain name address, or dynamically generated by a common host, or accessible through a common host (i.e., a particular page may be maintained on or generated by a remote server, but nonetheless be within a site).

The presentation server 200 provides an interface for one or more connections to the network 110, thus permitting more than one of the clients 102 to access the site at the same time. In one embodiment, the presentation server 200 comprises a plurality of enterprise servers, such as an enterprise server available from Sun Microsystems Inc. Other suitable servers are known in the art and are described in Jamsa, Internet Programming, Jamsa Press (1995), the teachings of which are herein incorporated by reference. The server maintains one or more connections to the Internet 110, preferably provided by a tier one provider, i.e., one of the dozen or so national/international Internet backbones with cross-national links of T3 speeds or higher, such as MCI, UUNet, BBN Planet, and Digex. Each enterprise server preferably runs the UNIX operating system, with a "front end" written in Java Server Page ("JSP"), or some other programming language or server software capable of integrating ActiveX controls, forms, Visual Basic Scripts, JavaScript, Macromedia Flash Technology multimedia, e-mail, and other functional and multimedia aspects of a page. Typically, the front end includes all text, graphics, and interactive objects within a page, along with templates used for dynamic page creation.

A client 102 accessing an address hosted by the presentation server 200 will receive a page from the presentation server 200 containing text, forms, scripts, active objects, hyperlinks, etc., which may be collectively viewed using a browser. Each page may consist of static content, i.e., an HTML text file and associated objects (*.avi, *.jpg, *.gif, etc.) stored on the presentation server 200, and may include active content including applets, scripts, and objects such as check boxes, drop-down lists, and the like. A page may be dynamically created in response to a particular client 102 request, including appropriate queries to the database server 204 for particular types of data to be included in a responsive page. It will be appreciated that accessing a page is more complex in practice, and includes, for example, a DNS request from the client 102 to a DNS server, receipt of an IP address by the client 102, formation of a TCP connection with a port at the indicated IP address, transmission of a GET command to the presentation server 200, dynamic page generation (if required), transmission of an HTML object, fetching additional objects referenced by the HTML object, and so forth.

The application server 202 provides the "back-end" functionality of the Web site, and includes connections to the presentation server 200 and the database server 204. In one embodiment, the presentation server 200 comprises an enterprise server, such as one available from Sun Microsystems, Inc., running the UNIX operating system. The back-end software is preferably implemented using pre-configured e-commerce software, to provide back-end functionality including order processing, billing, inventory management, financial transactions, shipping instructions, and the like. The e-commerce software running on the application server 202 includes a software interface to the database server 204, as well as a software interface to the front end provided by the presentation server 200.

The database server 204 may be an enterprise server, such as one available from Sun Microsystems Inc., running the UNIX operating system and software components for database management. Suitable databases are provided by, for example, Oracle, Sybase, and Informix. The database server 204 also includes one or more prospect list databases 206, typically embodied in a mass-storage device. The prospect list databases 206 may include, for example, on or more prospect lists acquired from list managers. As described in more detail below, the database management software running on the database server 204 receives properly formatted requests from the presentation server 200, or the application server 202. In response, the database management software reads data from, or writes data to, the databases 206, and generates responsive messages to the requesting server.

Acquisition of Prospect Lists

The acquisition of prospect lists over the computer network 110 is an important component of the online prospect list system of the present invention. The system and method of acquiring prospect lists of the present invention provides an accessible, efficient and flexible process for receiving a plurality of prospect lists, in a variety of list formats, from a plurality of list managers for storage in the database 206 of prospect lists. The list acquisition method and system described below allows a list manager to create, modify and remove prospect lists from the database 206 via a client system 102 over the computer network 110.

Figure 3:
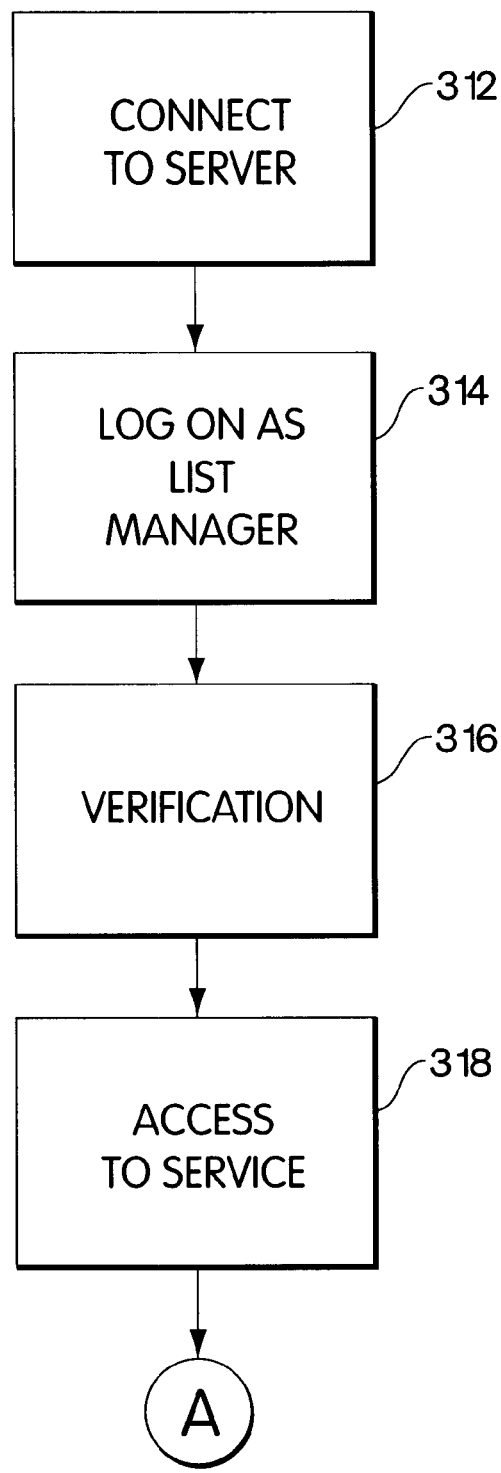
FIG. 3 is a flowchart illustrating a method for accessing the prospect list service of the present invention.

FIG. 3 shows a method for accessing the prospect list service hosted by a server, such as a server 104 illustrated in FIGS. 1 and 2. The list manager connects to the server 104 via a browser or other interface running on a client system 102, step 312. The list manager provides a user ID and a password to the server 104 to identify the list manager to the system, step 314. The prospect list system is preferably password protected to prevent unauthorized access to the prospect list system over the computer network 110. Generally, the user ID and password combination of a list manager is related to only the portfolio of the list manger, i.e., the prospect lists stored in the database that are managed by the list manager. The server 104 then verifies the identification and the password using any one of many network security protocols known in the art, step 316. Upon verification of the user ID and password combination, the list manager is granted access to the prospect list system being hosted by the server 104, step 318.

Upon accessing the prospect list system, the system provides the list manager with a number of list management options, including adding a new list or modifying or removing a list presently stored in the database 206. The interface of the prospect list system includes controls whereby one or more list manager can select and implement the list management options. The control may include code for rendering a control, or may specify any form of control that may be handled by the list manager, and may include, for example, a text box, a radio button, a drop-down list, one or more checkboxes, a scroll box, a slider, a dial, and the like. While use of these controls is known for, for example, Windows clients, other custom controls or other physical or graphical user interface controls may be defined for a list manager and used according to the principles of the invention.

Adding New Prospect Lists

Figure 4A:
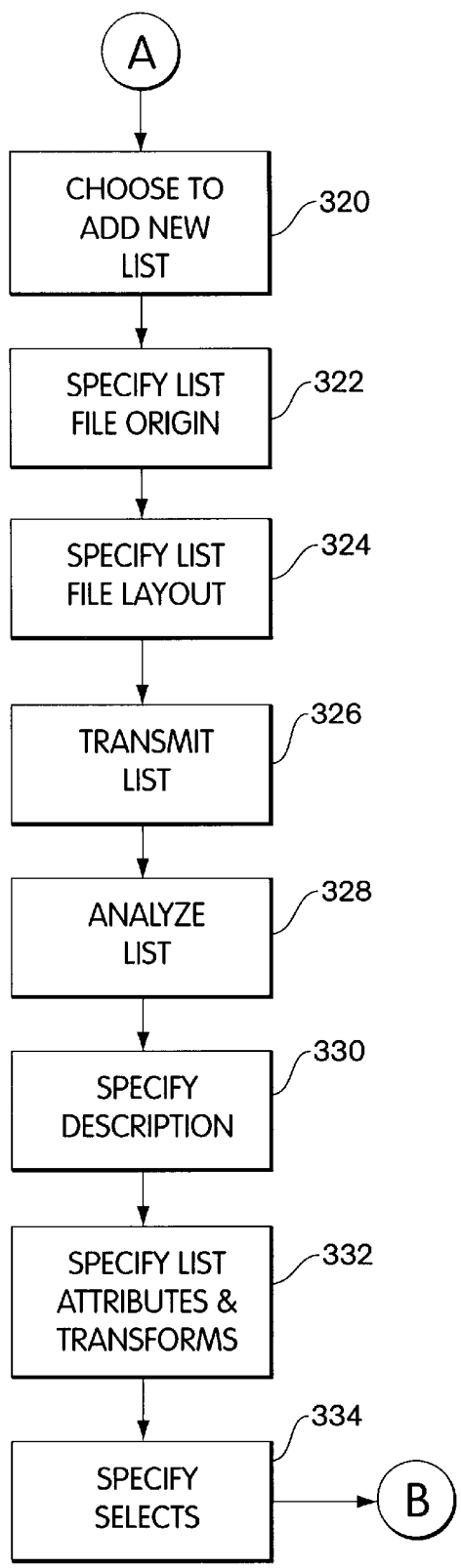
FIGS. 4A–4B are flowcharts illustrating a method of acquiring a new prospect list according to the teachings of the present invention.
Figure 4B:
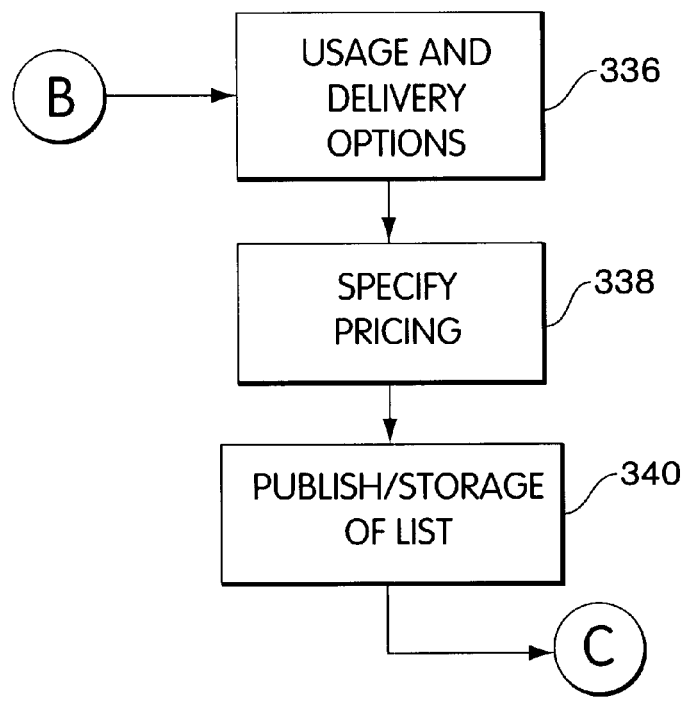

FIG. 4 illustrates a method of acquiring prospect lists over the computer network 110. Upon accessing the prospect list system, the list manager uses the interface controls to chose to a add a new prospect list to the database 206, step 320. The prospect list system prompts the list manager to specify the origin of the new list and the list manager uses the controls to specify the origin of the new prospect list, step 322. The list manager can specify the origin of the new list by identifying the address of the new list on the network 110. For example, the new list can be stored on a database coupled to the client system of the list manager or in another database located at another address on the network 110.

Upon receipt of the origin of the new list, the system prompts the list manager to identify the file layout of the new list and the list manager uses the controls to specify the file layout, step 324. Prospect lists can be provided in a variety of types of file formats including, for example, text formats such as ASCII and EBDIC, and software application formats such as dBase, Microsoft Access, and Microsoft Excel. The prospect list system solicits the file format type, the manner in which the data is laid out, e.g., fixed width field or comma separated fields, and the version of the software application, if a software application is used.

The list manager transmit the list to the server 104 hosting the list service over the network 110, step 326. Alternatively, the prospect list can be stored in an intermediate storage medium, such as a computer-readable storage medium or a paper print-out, and delivered to the prospect list system for inputting into the system. The new list is preferably stored in an intermediate computer-readable storage medium, for example at a location in the database 206 other than where formatted prospect list are stored or in a database separate from the database 206.

The prospect list system analyzes the attributes contained within the new prospect list, step 328. The analysis includes determining the range of data values, referred to herein as attribute data values, for each attribute contained in the new prospect list. The analysis can also include determining the frequency of attribute data values for each attribute and determining the number of distinct attribute data values for each attribute. For a example, a new prospect list from "Bicycle Magazine" containing 5 prospects can include the attributes: name, age, gender, bicycle type, address, and telephone number. The exemplary new prospect list, referred to herein as the Bicycle Magazine List, contains the following attribute values:

TABLE 1

| Attribute Prospect Name | Attribute Gender | Attribute Age | Attribute Address | Attribute Bicycle | Attribute Telephone |
| --- | --- | --- | --- | --- | --- |
| John Smith | M | 25 | 10 Elm St. Boston, MA | Schwinn | 555-1234 |
| Jane Doe | F | 35 | 5 Park St. Burlington, VT | Cannondale | 555-4321 |
| John Doe | M | 34 | 5 Park Avenue Burlington, VT | Cannondale | 555-4321 |
| Sally Frank | F | 35 | 20 Bird Street Las Angles, CA | Schwinn | 555-6789 |
| Chris Murphy | M | 42 | 12 East St Dallas, TX | Raleigh | 555-9876 |

The prospect list system analyzes the attribute "age" of the new prospect list as follows:

range of attribute values: 25–42 frequency of attribute values: 25(1), 35(2), 34(1), and 42(1), number of distinct attribute values: 4.

The prospect list system solicits a description of the new list from the list manager, which the list manager specifies, using the interface controls, to the list system, step 330. The description of the list can be used in a catalog of prospect lists available from the prospect list service to identify and describe the prospect list to list purchasers. The description can be stored in the database 206 with the description of other prospect lists available from the catalog. The description can contain descriptive data such as, for example, the name of the list, the attributes included in the list, and/or the privacy policy for the list. The privacy policy can dictate the type of access available to list purchaser. As described in more detail below in connection with the distribution of lists of potential customers, the list purchaser may be provided direct access to the prospects on a purchased list or, in the alternative, access may be granted only through a third party, such as a mail house, a telemarketer, or email service. For example, the description of the Bicycle Magazine List may be:

Name: Bicycle Magazine subscriptions

Attributes: Name, address, age, telephone number, bicycle type

Privacy Policy: Third party only

In addition, the description can include graphic or visual media to describe the prospect list. For example, an image of the magazine cover of Bicycle Magazine can be included with the description of the Bicycle Magazine list.

The prospect list system provides a number of pre-defined attributes, stored in the database 206, corresponding to the attributes of prospect lists stored in the database 206. The prospect list system requests the list manager to identify the attributes on the new prospect list. The prospect list system can then provide a map for transforming the format of the identified attributes to the format of the attributes that are predefined by the prospect list system, step 332. For example, the attribute "Gender" may be predefined by the prospect list system to have a format in which Male=1 and Female=2. In contrast, the Bicycle Magazine List formats the attribute "Gender" as Male=M and Female=F. Thus, the prospect list system can provide for the transformation for gender as M to 1 and F to 2. The transformation process can be implemented by the database system, described below, or by other software tools such as Trillium. If an attribute on the new prospect list does not correspond to a predefined attribute, the prospect list system can create a new attribute. Creating a new attribute includes specifying the name, description, and type of the new attribute. The type of attribute identifies the format of the data attribute values associated with the attribute. Exemplary types include number, dollar amount, date, or categorized information. Categorized information is information provided in sets of ranges, each set referred to as a category, as is described in more detail below.

The prospect list system can solicit from the list manager the attributes available to a list purchaser to create a subset of the new prospect list. These attributes are referred to as selects. Selects can be used by the list purchaser to create a more targeted list of prospective customers from a prospect list. The list manager specifies the selects using the interface controls, step 334.

The prospect list system can also solicit usage instructions for the new prospect list from the list manager. The list manager specifies the usage instructions to the prospect list system using the interface controls, step 336. Usage instructions control the distribution and use of the customer list by a list purchaser. For example, usage instructions can restrict the purchase of the prospect list to specific list purchasers, restrict the number of times the prospect list can be used by a list purchaser, or can specify that the list is to be delivered to a third party other than the list purchaser. For example, the list manager for the Bicycle Magazine List may not wish the List to be provided to a competing bicycle magazine. Through the usage instructions, the list manager can, thus, limit distribution of the Bicycle Magazine List to list purchasers other than competing bicycle magazines. In addition, the list manager may want to insure that the prospects on the prospect list receive promotional materials that project the proper image, as improper promotions may hurt brand image. The list manager can also require approval for each distribution of the prospect list through the usage instructions. Thus, as discussed below, the list manager's approval is solicited by the prospect list system during the prospect list distribution process.

The prospect list system solicits pricing instructions for the prospect list from the list manager, which the list manager specifies, using the interface controls, to the list system, step 338. Generally prospect lists are priced based on the cost per 1,000 names (CPM). The list manager can specify that the CPM rates for a prospect list vary based on the selects chosen by the list purchaser. For example, the list manager of the Bicycle Magazine List can specify that the CPM rate increases if a list purchaser chooses the select "bicycle type" from the list.

Once the list manager submits the requested information to the list system regarding the prospect list, the prospect list is prepared for publishing and storage by the prospect list system, Step 340, as described in more detail below.

One skilled in the art will appreciate that the order in which prospect list information is solicited from the list manager and received by the prospect list system can be varied without departing from the scope of the present invention. Likewise, any number of the steps described above and illustrated in FIGS. 4A and 4B can be combined into a processing single step. For example, the prospect list description, the usage instructions, and the prospect list pricing data, can be solicited from the list manager and submitted to the prospect list system in a single step.

Removing a Prospect List

Figure 5:
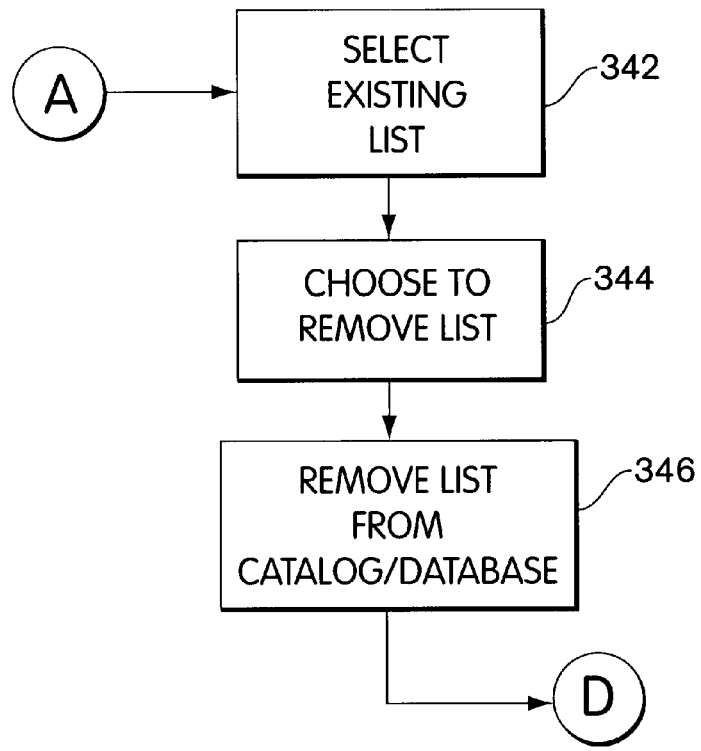
FIG. 5 is a flowchart illustrating a method of removing a prospect list from the prospect list service according to the teachings of the present invention.

Prospect lists become "stale" after a period of time. A list manger may choose to remove a stale prospect list from the catalog and database provided by the prospect list system. FIG. 5 illustrates a method of removing a prospect list from the prospect list system according to the teachings of the present invention. Upon accessing the prospect list system, as illustrated in FIG. 3 and described above, the list manager selects a list from his or her portfolio of prospects list stored in the database 206, step 342. Using the interface controls of the prospect list system, the list manager can instruct the prospect list system to remove the selected list from the portfolio, step 344. The list system can optionally provide the list manager with an interface to confirm the removal of the selected list from the portfolio.

Once the list manager instructs the prospect list system to remove a list, the list system proceeds with removing the list from the catalog and the database 206, step 346. The selected list will no longer be available for orders through the prospect list system and the data associated with the list is removed from the database 206.

Suspending a Prospect List

Figure 6:
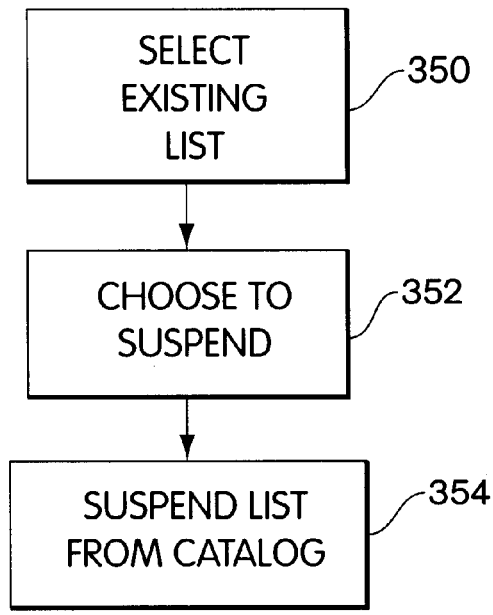
FIG. 6 is a flowchart illustrating a method of suspending a prospect list from the prospect list service according to the teachings of the present invention.

FIG. 6 illustrates a process for suspending a list from the catalog of the prospect list system. The prospect list system provides the list manager with the ability to suspend orders on a prospect list available through the prospect list system. To begin this process, the list manager first accesses the prospect list system. Through the interface controls of the prospect list system, the list manager selects a prospect list from his or her portfolio of prospect lists, step 350. The list manager then instructs the prospect list system to suspend orders on the prospect list using the interface controls, step 352. The prospect list system may optionally present the list manager with an interface to confirm the suspension of orders on the prospect list.

Upon receiving instructions from the list manager to suspend a prospect list, the prospect list system removes the prospect list from the catalog, step 354. However, the prospect list is not removed from the database 206.

Resuming a Prospect List

Figure 7:
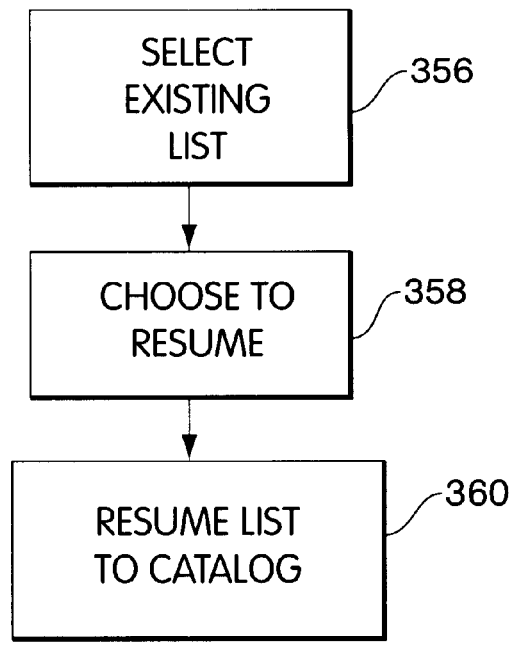
FIG. 7 is a flowchart illustrating a method of resuming a prospect list on the prospect list service according to the teachings of the present invention.

FIG. 7 illustrates a method for resuming orders on a suspended prospect list. After accessing the prospect list system, the list manager selects a suspended list from his or her portfolio of prospect lists, step 356. Using the interface controls of the prospect list system, the list manager can instruct the prospect list system to resume taking orders on the suspended prospect list, step 358.

Upon receiving instructions from the list manager to resume a suspended list, the prospect list system returns the suspended prospect list to the catalog, step 360.

Refreshing Data in a Prospect List

The prospect list system allows a list manager to refresh or update data contained in a prospect list available on the prospect list system. The prospect list system refreshes the data in a prospect list by replacing the existing data stored in the database 206 with new list data contained in a prospect list data file provided by the list manager.

Figure 8:
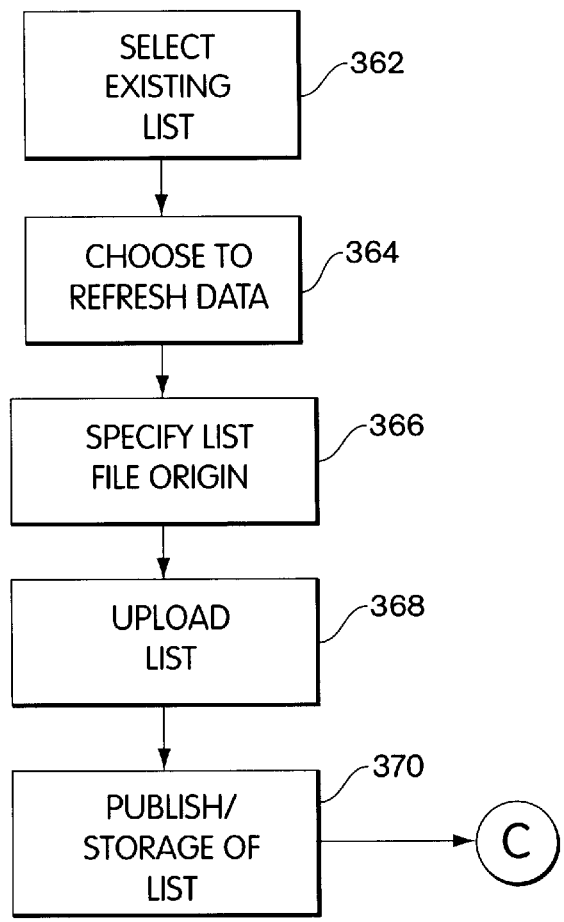
FIG. 8 is a flowchart illustrating a method of refreshing data in a prospect list available from the prospect list service of the present invention.

FIG. 8 illustrates a method of refreshing data in a prospect list according to the teachings of the present invention. Upon accessing the prospect list system, the list manger selects an existing prospect list from his or her portfolio of prospect lists, step 362. Using the interface controls, the list manager informs the prospect list system that the selected prospect list is to be refreshed, step 364, and identifies the origin, e.g., the address, of the new prospect list data file, step 366. In addition, the list manager can specify to the prospect list system that the new prospect data file contains either a full refresh or an incremental refresh. In a full refresh, the contents of the new list data file completely replace the contents of the existing prospect list file. In an incremental refresh, the contents of the new list data file are added to or modify the contents of the existing prospect list.

Upon receiving instructions from the list manager concerning the refreshing of data on a prospect list, the prospect list system uploads the new list data file from the list origin specified by the list manager, step 368. The prospect list system updates the selected prospect list by storing the new list data file in the database 206, step 370, as described in more detail below.

Updating the List Description of a Prospect List

The prospect list system of the present invention permits a list manager to update the list description of a prospect list available on the prospect list system. Updating of the list description can be effected without updating the data contained in the prospect list.

Figure 9:
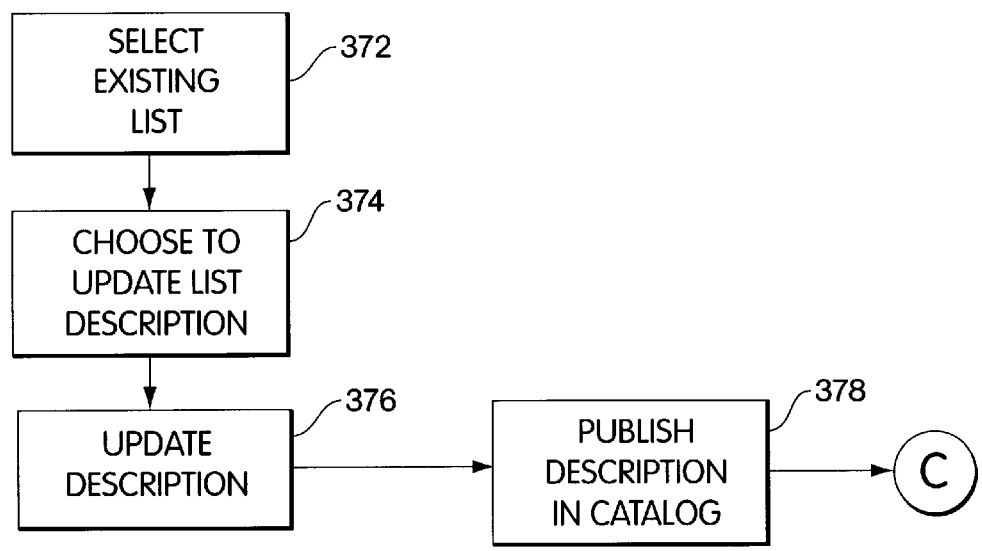
FIG. 9 is a flowchart illustrating a method of updating the list description of a prospect list available from the prospect list service of the present invention.

FIG. 9 illustrates a method of updating the list description of a prospect list. Upon accessing the prospect list system, the list manager can select an existing prospect list from his or her portfolio of prospect lists, step 372. Using the interface controls, the list manager can choose to update the list description of the selected prospect list, step 374. The list description can be updated by changing any of the descriptive data associated with the list including the name of the list, the description of the attributes associated with the list, the privacy policy of the list, and/or the visual or other media used to describe the list, step 376.

Upon receiving instructions from the list manager to update the list description of a prospect list, the prospect list system updates the list description published in the catalog of prospect lists available from the prospect list system, step 378.

Updating the Pricing of a Prospect List

Figure 10:
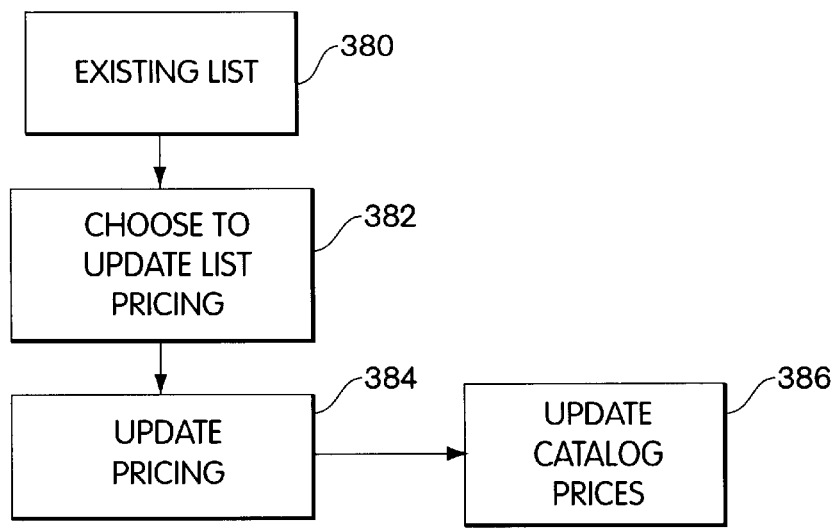
FIG. 10 is a flowchart illustrating a method of updating the pricing of a prospect list available from the prospect list service of the present invention.

The prospect list system of the present invention allows list managers to modify the pricing of prospect lists available from the prospect list system. FIG. 10 illustrates a method of updating the pricing list available on prospect list system. Upon accessing the prospect list system, the list manager selects a prospect list from his or her portfolio of prospect lists, step 380. Using the interface controls, the list manager can choose to update a prospect list in the portfolio, step 382. The list manager can then submit the updated pricing to the prospect list system, step 384. Upon receiving instructions from the list manager to update the pricing of a prospect, the prospect list system modifies the price of the prospect list published in the catalog of prospect lists available from the prospect list system, step 386.

Updating the List Format of a Prospect List

Figure 11:
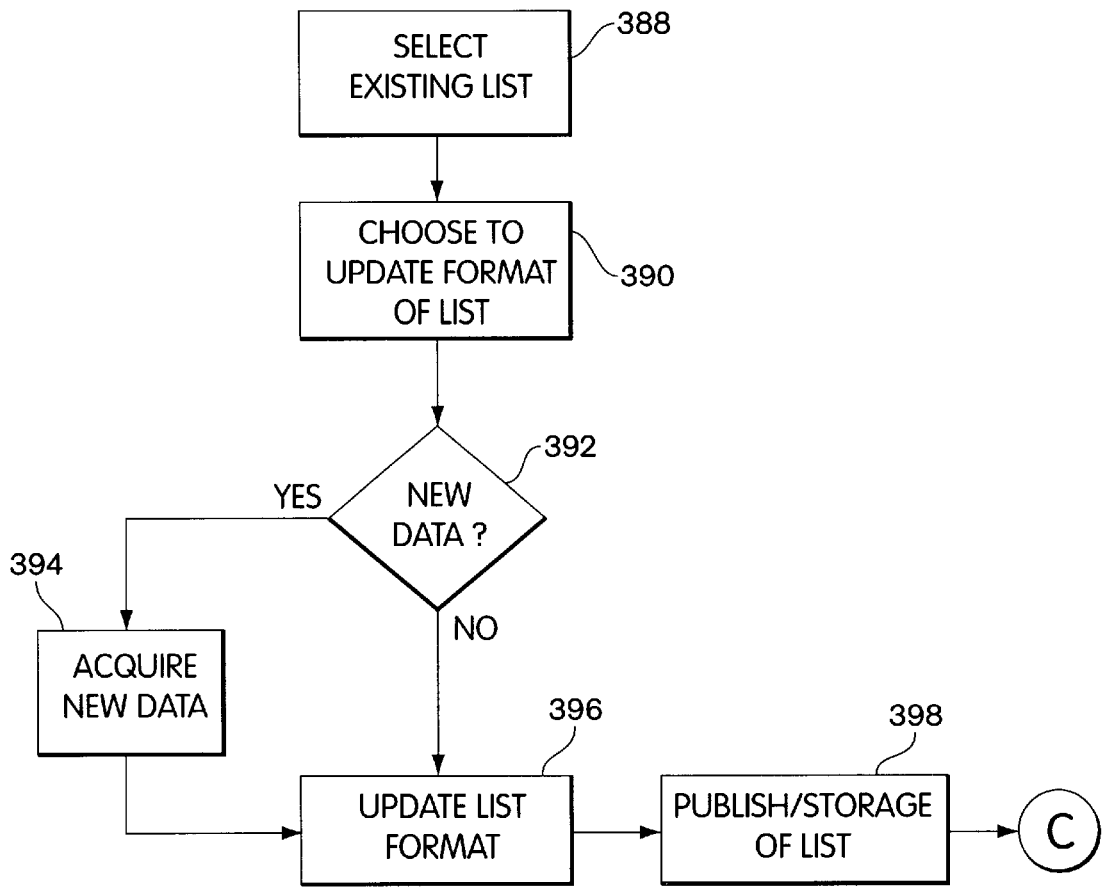
FIG. 11 is a flowchart illustrating a method of updating the pricing of a prospect list available from the prospect list service of the present invention.

The prospect list system of the present invention allows the list manager update the format of a prospect list available from the prospect list system by adding new attributes to the list or modifying existing attributes of the list. FIG. 11 illustrates a method of updating prospect list available from the prospect list system. Upon accessing the prospect list system, the list manager selects an existing list from his or her portfolio of prospect lists available on the prospect list system, step 388. Using the interface controls, the list manager chooses to update the format of the selected prospect list, step 390. The prospect list system then requests the list manager to indicate whether new attributes are to be added to the prospect list or existing attributes are to be modified, step 392. If new attributes are being added to the prospect list, new data corresponding to the new attribute must be acquired by the prospect list system, step 394. New attribute data is acquired by the prospect list system in the same manner as a new prospect list is added to the system, as described above in connection with FIGS. 4a and 4b. The list manager identifies the file origin of the new attribute data and specifies the file layout of the new attribute data. The attribute data can then be uploaded to the prospect list system and the attribute data can be analyzed by the prospect list system.

Upon receiving instructions from the list manager to update the format of the list, prospect list system updates the list format, step 396. Updating can include the prospect list system soliciting the list manager to specify the new or modified list attributes and provide a map for transforming the format of the identified attributes to the format of the attributes that are predefined by the prospect list system. In addition, the prospect list system can solicit from the list manager the attributes available to a list purchaser to create a subset of new prospect lists, the usage instructions for the prospect list, and the pricing instructions for the prospect list. The prospect list system updates the catalog to reflect the new and/or modified attributes and stores the new or additional data in the database 206, step 398.

Storage of Prospect Lists

The storage of prospect lists in the prospect list database 206 is a important component of the online prospect list system of the present invention. The prospect list database 206 may be realized using any database system including, object oriented or relational database systems. Preferably, a relational database system, such as, for example, Oracle, MySQL, Infomix, DBS, or SQL Server is used to realize the prospect list database 206. For this reason, the following description and associated figures describe the prospect list database 206 using relational database technology. However, one skilled in the art will appreciate that other database systems may be used to implement the prospect list database of the present invention without departing from the scope of the preset invention.

Prospect List Database

Figure 12:
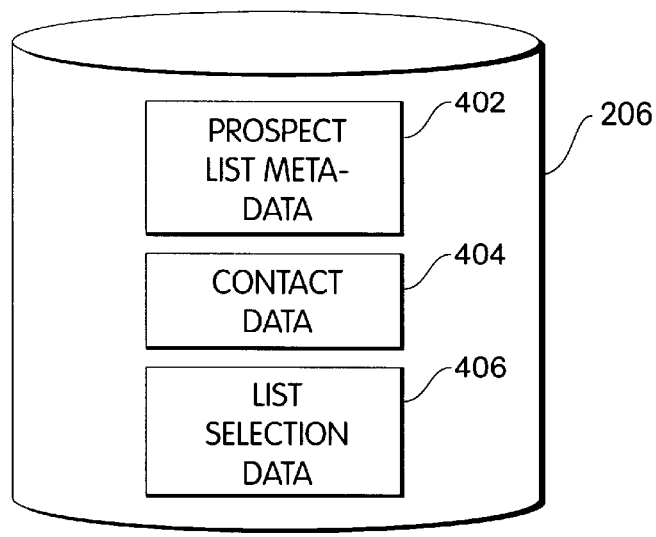
FIG. 12 is a schematic diagram of the prospect list database of the prospect list service of the present invention.

FIG. 12 provides a general overview of the database schema of the prospect list database of the present invention. The prospect list database is made-up of a collection of data structures and the relationships between those data structures. The data structure can be a table from a relational database, an object from an object oriented database or any other type of data structure which can be used to store data in a database. As the prospect list database is preferably implemented by a relational database system, the following description of the component database structures will use the terminology of relational databases. One skilled in the art will appreciate, however, that the type of database structure is dependent upon the database system employed, and that alternative structures may be used without departing from the scope of the present invention.

The prospect list database 206 is organized in database sections and includes a prospect lists metadata section 402, a contact data section 404, and a list selection data section 406. Each of the sections of the database includes one or more data tables containing data relating to the prospect list acquired for storage in the database. The prospect list metadata section 402 contains data tables for storing data from the prospect list, such as, the list description, the attributes and the attribute data associated with the prospect list. The contact data section 404 contains contact information for each of the prospects on each of the prospect lists stored in the database. The list selection data section 406 contains data tables for storing information related to attributes or selects, and the data values associated therewith, that are available to a list purchaser, through the prospect list system, to identify prospective customers from the prospect lists stored in the database.

Figure 13:
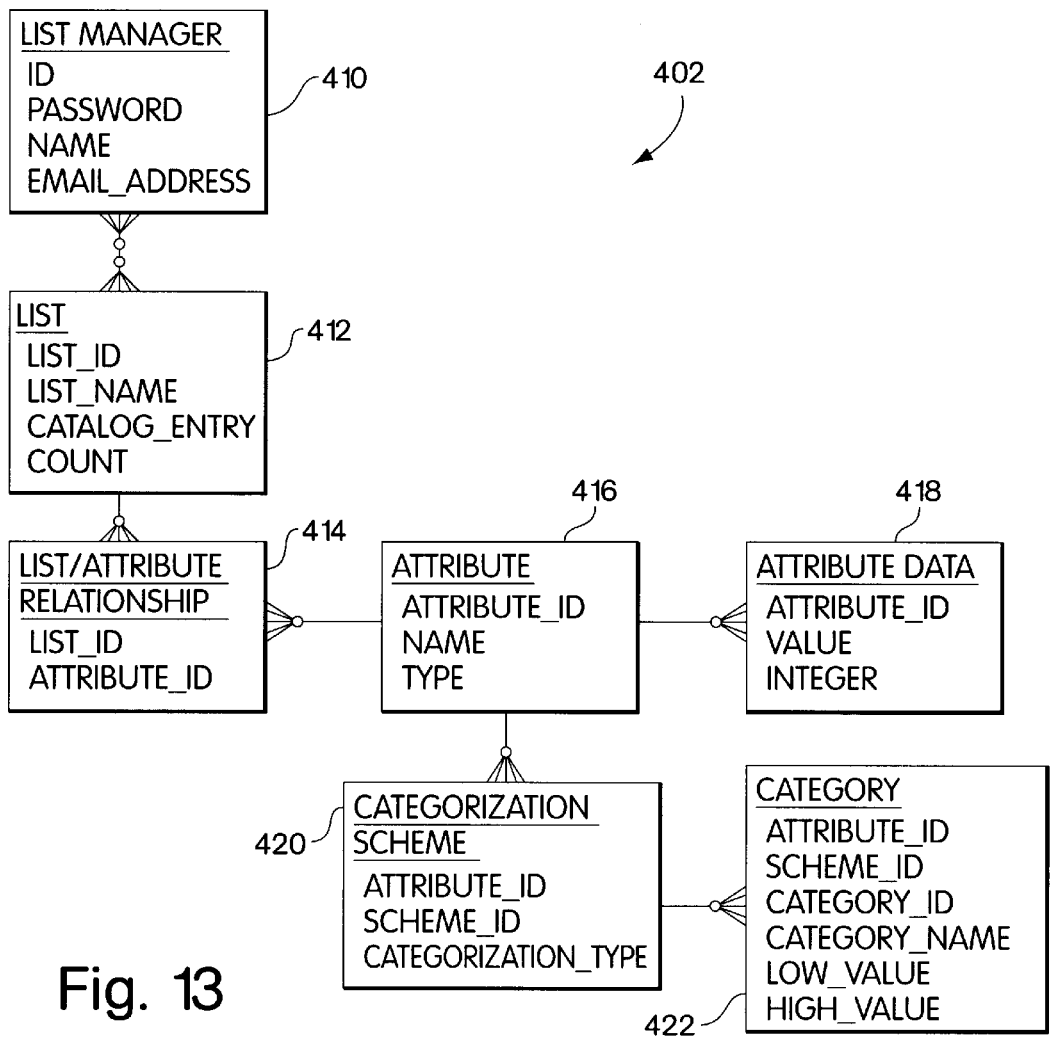
FIG. 13 is a schematic diagram of the prospect list metadata section of the database of prospect lists of the present invention.

Referring to FIG. 13, the general database schema of the prospect list metadata section 402 of the database 206 is illustrated. The prospect list metadata section 402 includes a plurality of data tables for storing information and data from the prospect lists acquired by the prospect list system.

A list manager data table 410 is provided to store information about a particular list manager. Each list manager can be assigned a list manager data table to identify the list manager to the prospect list system. The list manager data table stores the name of the list manager and the user ID and password combination for the list manager. In addition, the list manager data table can store the contact information for the list manager, such as, for example, the email address, telephone number, fax number, and/or mail address of the list manager.

General information about each prospect list acquired by the prospect list system is stored in a list data table 412. Each list data table 412 can correspond to one prospect list stored in the prospect list database. The list data table 412 contains information to identify the list to the product list system, including an unique list ID assigned to the prospect list by the prospect list system. The list data table 412 can also contain the list name, e.g., "Bicycle Magazine List", a catalog entry for the list, and a count of the number of prospects included in the prospect list. The category entry can be the list description provided by the list manager during the list acquisition process, described above.

As each prospect list can be managed by one or more list managers, each list data table 412 can be related to one or more list manager tables 410. A list manager/list relationship table (not shown) can be used to identify each relationship between a prospect list and a list manager. Similarly, one list manager may manage one or more prospect lists. Thus, a relationship table can also be used to identify the relationship between a list manager and each of the prospect list managed by the list manager.

Each attribute from a prospect list is identified in an attribute data table 416. Each attribute is assigned an unique attribute ID, which is stored in the attribute data table 416. The prospect list system uses the attribute ID to track the attribute in the database. In addition, the attribute data table 416 can store the name of the attribute and the type of attribute. The type of attribute can be used by the prospect list system to distinguish numerical or character based attributes, referred to as discrete attributes, from categorical attributes. For example, the attribute "age" can be a numerical attribute in which the data reflects the actual age of the prospect or a categorical attribute in which the data represents a range of ages, e.g. 10–20.

A list/attribute relationship table 414 specifies the relationship between a prospect list and the attributes associates with the prospect list. Each list/attribute relationship table contains the attribute-data list ID of the prospect list and an attribute ID of one of the attributes associated with the list.

Attribute data corresponding to an attribute is stored in an attribute-data data table 418. The attribute-data data table 418 contains the attribute ID for the attribute and the data associated with the attribute. In addition, each attribute data value is preferably assigned an unique integer to facilitate searching the database. For example, for the attribute "age" of the Bicycle Magazine List (Table 1), the attribute data table may store the data value 25, the integer "1" assigned to the value, and the attribute ID assigned to the attribute.

The data corresponding to certain attributes may be formatted in the form of ranges rather than discrete numerical values For example, the attribute "age", can have the following data values: 10–19, 20–29, 30–39, etc. Each set of ranges, e.g., 10–19, is referred to herein as a category. A categorization scheme data table 420 and related category data tables 422 are provided to store attributes having data values formatted in ranges. The categorization scheme data table 420 stores the attribute ID associated with the categorization scheme and an unique scheme ID assigned to the categorization scheme. In addition, the categorization scheme data table 420 can store the categorization type of the categorization scheme. Each attribute can optionally be associated with zero or more categorization schemes. In addition, the list attribute relationship table 414 can store the scheme ID for a categorization scheme to identify the relationship between a list, an attribute, and a categorization scheme.

The categories associated with a categorization scheme are stored in a category data table 422. Each category data table 422 corresponds to one category of the categorization scheme. The category data table 422 contains the attribute ID of the corresponding attribute, the scheme ID of the corresponding categorization scheme, and an unique category ID assigned by the prospect list system to the category. Preferably, the category ID assigned to the category is an integer to facilitate searching the database. In addition, the category data table 422 can store the category name of the category. The data range associated with the category can be defined by a low data value and a high data value, each of which can be stored in the category data table 422. For example, the age range 30–39 may be assigned the category name "ages 30–39" and the category data table 422 may store a low value of 30 and a high value of 39.

Each categorization scheme is associated with one attribute and each categorization scheme can optionally have zero or more categories associated therewith. Each category is associated with a single categorization scheme.

Figure 14:
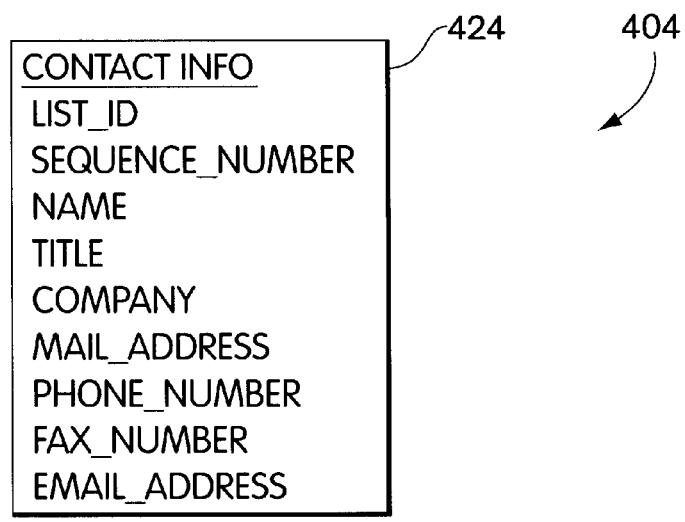
FIG. 14 is a schematic diagram of the contact data section of the database of prospect lists of the present invention.

FIG. 14 illustrates a contact info. data table 424 of the contact data section 404 of the prospect list data base 206. Each prospect on a prospect list stored in the database 206 is identified by a contact info. data table 424. Thus, the contact data section 404 of the database contains a plurality of contact info. data tables 424, each corresponding to a prospect stored in the database.

Each contact info. data table 424 contains the list ID of the prospect list to which the prospect is associated with. In addition, the contact info. data table 424 can contain the name of the prospect and any contact information provided by the prospect list. Contact information can include, for example, the mail address, the telephone number, the fax number, and/or the email address of the prospect. The title and company of the prospect can also optionally be stored in the contact info. data table 424. A sequence number assigned to the prospect during the list storage process, described below, can also be stored in the contact info. data table. The information stored in the contact info. data table 424 can selectively be provided to the list purchaser, either directly or though a third party, during the prospect list distribution process described below.

Figure 15:
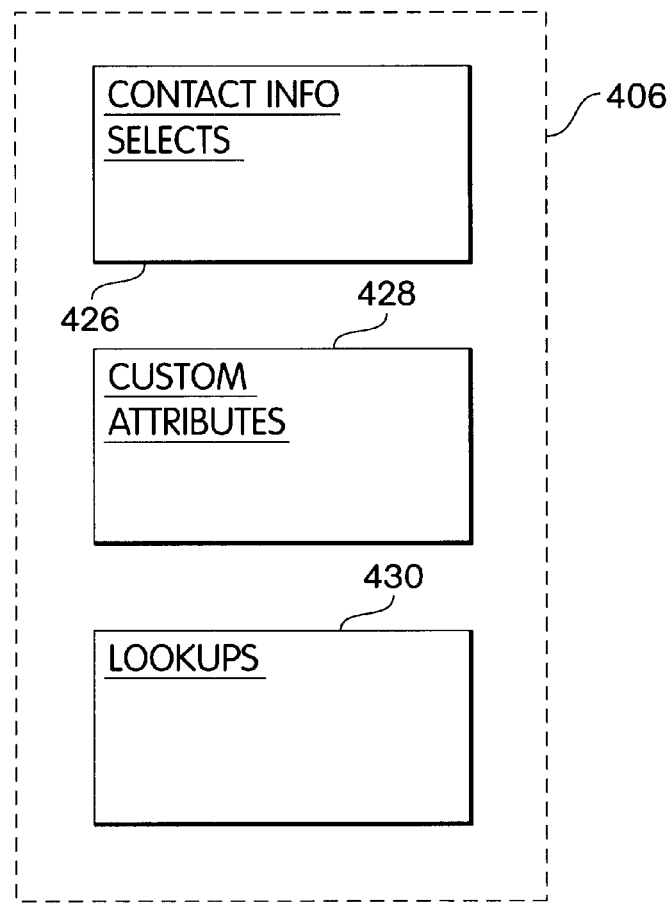
FIG. 15 is a schematic diagram of the list selection data section of the database of prospect lists of the present invention.

The list selection data section 406 contains a number of subsections, each containing data tables, as illustrated in FIG. 15. The subsections of the list selection data section 406 can include a contact info. selects subsection 426, a custom attributes subsection 428 and a lookup subsection 430. Each of these subsections is described below.

Figure 16:
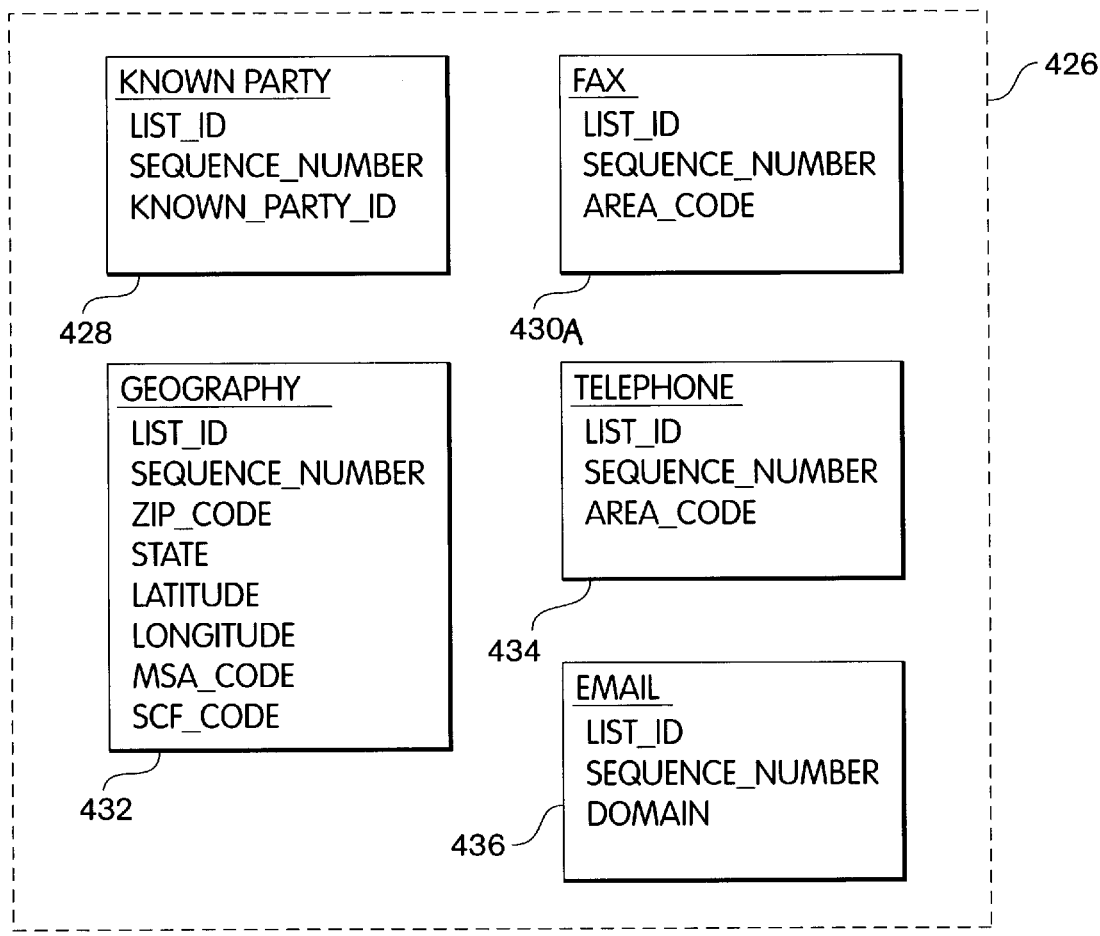
FIG. 16 is a schematic diagram of the contact list data section of the prospect list metadata section of the database of prospect lists of the present invention.

FIG. 16 illustrates the data tables that can be included in the contact info. selects subsection 426. Each of the data tables in the contact info. selects subsection 426 correspond to standard attributes or selects available to a list purchaser from the prospect list system to identify a list of perspective customers. For example, a known party data table 428 can be provided to identify prospects for each prospect list stored in the database. Each prospect stored in the database is assigned a known party ID. Through a matching process, described below, prospects appearing on more than one list are assigned the same known party ID. The known party ID. is stored in the known party data table to identify the prospect. The known party data table 428 allows a list purchaser to remove duplicate prospects, i.e., those identified by the same known party ID, from the list of perspective customers purchased from the prospect list system. The known party data table 428 can also store the list ID. of the prospect list that the prospect is associated with and a sequence number assigned to the known party. Each known party data table 428 corresponds to one prospect stored in the database 206.

Other selects that can be available through the prospect list system for each prospect include fax number stored in the fax data table 430a, telephone number, stored in the telephone data table 434, email address, stored in the email address data table 436, and geographical location, stored in the geography data table 432. One skilled in the art will appreciate that other selects or attributes can be used.

The fax data table 430a stores the area code of the fax number of each prospect stored in the database and the list ID corresponding to the prospect list that each prospect is associated with. In addition, the sequence number of each prospect can optionally be stored in the fax data table 430a. Fax number information stored in the fax data table 430a can be used by a list purchaser to select one prospects from a specific area code.

Geography data table 432 stores geographic information related to each prospect stored in the database. The geographic information can include any data that identifies the location of the prospect, such as, the zip code, the state, the latitude, and/or the longitude of the mailing address of the prospect. In addition, the geography data table 432 can include one or more geocodes such as the sectional controlled facility (SCF) or the metropolitan stactical area (MSA) code corresponding to the mailing address of each prospect. The list ID of the prospect list of each prospect is stored in the geography data table 432. In addition, the sequence number assigned to each prospect can optionally be stored in the geography data table 432.

The geographic data contained geography data table allows a list purchaser to select prospect customers from a specific geographical area. For example, a list purchaser may select prospective customers from a specific zip code, a specific state, a specific MSA code or a specific SCF code. In addition, the geographic data allows the list purchaser to select prospective customers found within a specific distance of the list purchaser's business address. For example, a list purchaser may select all prospective customers within 10 miles of the business location of the list purchaser.

The telephone data table 434 contains the area code of each prospect and the list ID of the prospect list that each prospect is associated with. The sequence number assigned to the prospect can optionally be contained in the telephone data table 434. Telephone data stored in the telephone data table 434 can be used by a list purchaser to select prospective customers from a specified area code.

The email data table 436 stores the domain name of the email addresses of each prospect and the list ID. of the prospect list that each prospect is associated with. The sequence number assigned to each prospect can optionally be stored in the email data table 434. Email data stored in the email data table 436 can be used by a list purchaser to select prospective customers within a particular domain name.

The custom attributes of section 428 of the database 206 contains a plurality of discrete attribute tables 440 and categorized attribute tables 442 available to a list purchaser to select prospective customers stored in the database 206. Each discrete attribute table 440 identifies an attribute or select and the data values associated with attribute. The attributes identified during the prospect list acquisition process, described above as well as existing attributes, can be stored in a discrete attribute table 440. For example, a discrete attribute for the Bicycle Magazine List (Table 1), may be the attribute "bicycle type". Each discrete attribute table 440 corresponds to one attribute and contains the attribute ID of the attribute. The list ID of the prospect list that the attribute is associated with is also stored in the discrete attribute table 440, as well as the discrete data values associated with the attribute. The data values are preferably stored as the integer assigned to the attribute value to facilitate searching. A sequence number assigned to the attribute during the prospect list storage process described below may also be stored in the discrete attribute table.

Each categorized attribute data table 442 corresponds to an attribute having a data format in which the data is presented in ranges. Each categorized attribute data table 442 corresponds to one categorized attribute and contains the attribute ID of the attribute, the scheme ID of the categorization scheme, and the category ID of the category or categories corresponding to the attribute. In addition, the list ID of the prospect list that the categorized attribute is associated with stored in the categorized data table 442.

Figure 18:
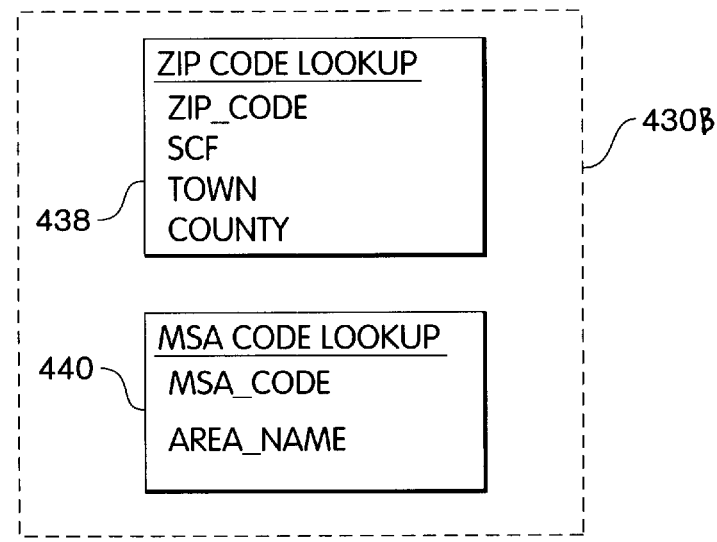
FIG. 18 is a schematic diagram of the lookup section of the database of prospect lists of the present invention.
Figure 17:
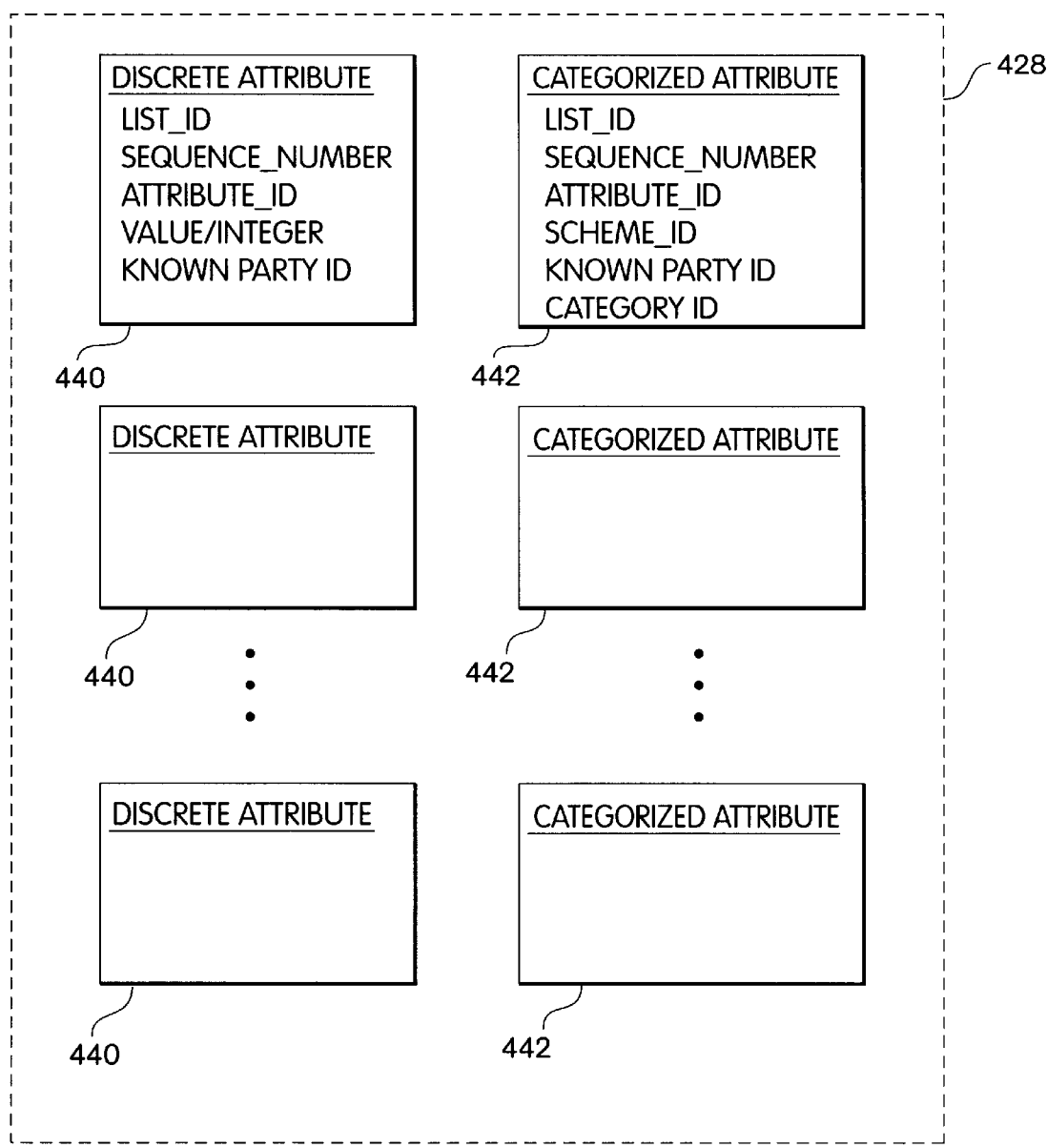
FIG. 17 is a schematic diagram of the custom attribute section of the database of prospect lists of the present invention.

The lookups subsection 430b of the database can include data tables providing reference information to the list purchaser, as illustrated in FIG. 18. For example, a zip code lookup data table can be provided to assist a list purchaser in identifying a zip code or group of zip codes corresponding to a specific geographic area. The zip code lookup 438 can include the town, county, or other geographic data, corresponding to a given zip code. In addition, the sectional control facility (SCF) of which the zip code is a part, can be included in the zip code lookup 438.

Additionally, a MSA code lookup data table can be provided to assist a list purchaser in identifying the metropolitan statistical area (MSA) of a specific geographic region. An MSA code identifies a specific geographic region. The MSA code lookup data table can store the MSA code and the corresponding area name. For example, the MSA code for the geographic region "Boston MA-NH" is 1120.

List Storage Process

Figure 19:
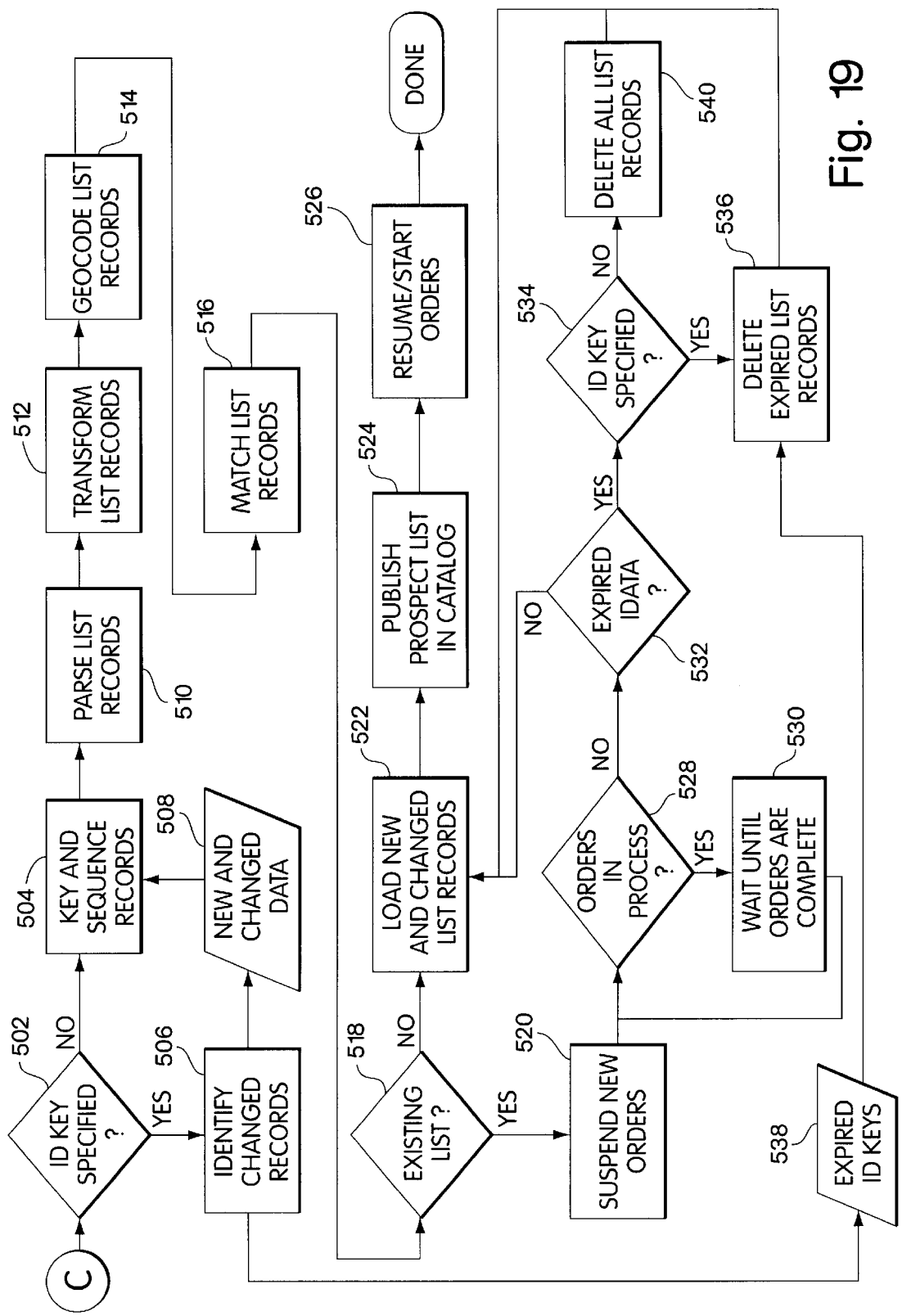
FIG. 19 is a flowchart illustrating a method of storing process lists in the database of prospect lists of the present invention.

A process for storing a prospect list in the database 206 is illustrated in the flow chart of FIG. 19. The list storage process can be effected by the database system associated with the database, without the need for input from the List Manager. The list storage process described below can be used to store new prospect list or to modify existing prospect list. The list storage process is invoked upon the conclusion of the list acquisition or list modification processes described above.

Initially, the prospect list system analyzes the acquired prospect list to determine whether or not an ID key is specified for each record contained in the prospect list, step 502. A record can be a prospect, an attribute, or other data associated with the prospect list. Each record included with the prospect list is assigned an ID key. For example, each attribute is assigned an attribute ID and each prospect is assigned a prospect ID. ID keys are used as a way for the list prospect system to uniquely identify each record in a prospect list.

If no ID key is specified for the record in the prospect list, the prospect list system assigns a unique ID key to each of the records in the prospect list, step 504. In addition, the prospect list system can assign a sequence integers to each of the records in the prospect list. The sequence numbers are a set of sequential integers assigned to the records of a prospect list. Each prospect list can have an unique set of sequence numbers assigned to the records within the list. Sequence numbers assist the prospect list system to track a prospect list record throughout the database 206.

If an ID key is specified for one or more records of the prospect list, the prospect list system identifies any changed records associated with the prospect list, step 506. Changed records can be records added to the prospect list or modified records in the prospect list. An added records can be a record having an ID key that was not assigned by the prospect list system. A changed record is a record having an ID key that matched a previously existing record stored in the database 206, but the data associated with the record does not match the data associated with the record stored in the database. The prospect list system can also identify expired records, step 538. Expired records are records previously stored in the database and having an ID key associated therewith, but not present in the new prospect list.

Upon identifying the changed records in the prospect list, the prospect list system produces a new and changed data file, step 508 and an expired ID key file, step 538. ID keys and/or sequence numbers can be added to the records in the new and changed data file, step 504. Expired ID keys refer to ID keys associated with expired records stored in the database.

The prospect list system parses the records of the prospect list by splitting the records into pre-defined components, step 510. For example, each attribute can be divided into a pre-defined component attribute. Parsing the records allows the prospect list system to work with each attribute independently or as a component attribute. Name and address attributes can be split into component attributes. For example, the name "John Smith" can be split into a first name component attribute, "John", and a last name component attribute, "Smith." The parsed attributes, such as the name attribute and the address attribute are used in the geocoding process and the matching process described below.

The prospect list system transforms the list records according to the transformation rules specified during the list acquisition process, step 512. Transformation of the records insures that the records, i.e., the attributes, are stored in the database in a common format. In addition, the prospect list system transforms name and address attributes into standard formats. For example, the name "Joe" can be transferred to "Joseph." Addresses can be transformed to a standard mailing address. Transformation of the name and address into standard formats facilitates matching of prospects during the matching process, described below.

The prospect list system geocodes the prospect records in the prospect list by adding geographic data to the prospect records, step 514. The geocoding process can add geographic data such as the latitude, longitude, and the MSA code to the prospect record. The geocode data facilitates matching of prospects during the matching process and can assist a list purchaser in selecting perspective customers from a specific geographic area.

In the matching process, the prospect list system matches new records from the prospect list with existing records stored in the database, step 516. Frequently, a prospect can appear on more than one prospect list stored in the database. To avoid duplicate mailing or other marketing efforts, the prospect list system identifies prospects appearing on multiple prospect list in the database using the matching process. The matching process can be implemented by the database system or by a software tool such as Postalsoft or Trillium. The matching process is driven by a set of matching rules that determine the likelihood that two records match. If the determined likelihood is above a specified threshold, the records are considered to match. If a new record matches an existing record stored in the database, the prospect associated with the new record is assigned the known party ID of the existing records. If the new record does not match an existing record stored in the database, the prospect associated with the new record is assigned a new known party ID. For example, referring to the Bicycle Magazine List (Table 1), the matching process can determine that the name attribute, address attribute, and telephone attribute for John Smith are substantially similar to the name attribute, address attribute, and telephone attribute of prospect Jonathan Smith from a Running Magazine List stored in the prospect list database. Thus, prospect John Smith and prospect Jonathan Smith can be assigned the same known party ID.

The matching process is useful not only in determining whether an individual appears on multiple prospect list stored in the database, but can also be useful for determining whether a household or business having a common mailing address is included on multiple prospect list stored in database. For example, referring to the Bicycle Magazine List (Table 1), the matching process can determine that the address attribute for prospect Jane Doe is substantially similar to the address attribute of prospect John Doe, and that the telephone attribute of Jane Doe is identical to the telephone attribute of prospect John Doe. As a result, the prospect list system can determine that prospect Jane Doe and prospect John Doe are members of the same household and, consequently, assigned both prospects a common known household ID. Known household IDs can be stored in a data table of the prospect list database.

The prospect list system determines whether the incoming prospect list is an existing prospect list stored in the database or a new prospect list, step 518. This determination can be made by identifying the acquisition process invoked by the list manager. For example, if the list manager invoked the new list acquisition process described above and illustrated in FIGS. 4A and 4B, the prospect list system will determine that the incoming list is not a existing list stored in the database. Otherwise, the prospect list system will determine that incoming list is an existing list stored in the database.

If the prospect list system determines that a new list is being stored in the database, the prospect list system loads the new list and the records associated therewith into the prospect list database 206. As discussed above, each prospect list is assigned a list ID stored in a list data table and each attribute from the prospect list is assigned an attribute ID and stored in an attribute data table 416.

Upon storing the records from the prospect list in the prospect list data, the prospect list system publishes the availability of the prospect list in a catalog of prospect list available from the prospect list system, step 524. The catalog can be published on a Web site accessible via client systems over the computer network. Alternatively, the catalog can be published in paper or other format for distribution to potential list purchasers.

Once the prospect list is published in the catalog, the prospect list system can begin taking orders from list purchasers for the prospect list, step 526.

If the prospect list system determines that the incoming prospect list is an existing list, the prospect list system suspends any new orders from list purchasers for the incoming prospect list, step 520. Suspending new orders prevents list purchasers from purchasing the list while the prospect list is being updated by the prospect list system.

Next, the prospect list system determines if there are orders in process for the incoming prospect list, step 528. If there are new orders in process, the prospect list system waits until the orders are complete prior to updating the prospect list, step 530.

If the prospect list system determines that no orders are in process, the prospect list system determines whether the incoming prospect list contains expired data, step 532. If the prospect list system determines that expired data is not present, the prospect list system proceeds with storing the prospect list in the database (step 522), publishing the prospect list in the catalog (524), and resuming orders on the prospect list (526).

If the prospect list system determines that the prospect list contains expired then the prospect list system begins a process of deleting the expired records from the prospect list stored on the database. Initially, the prospect list system determines if the prospect list contains ID keys identifying the expired records on the prospect list. If no ID keys are specified, the prospect list system deletes all existing records associated with the prospect list, as the prospect list system cannot determine which records expired, step 540. This step removes any old records from the database to prepare for a new prospect list to be stored in the database.

If the prospect list system determines an ID key is specified for the data, the prospect list system deletes the records identified by the ID keys, step 536 and the ID keys associated with the deleted records. The prospect list system then loads the remaining records into the database (step 522), publishes the prospect list in the catalog (524) and resumes taking orders from list purchasers on the prospective list (526).

List Removal Process

Figure 20:
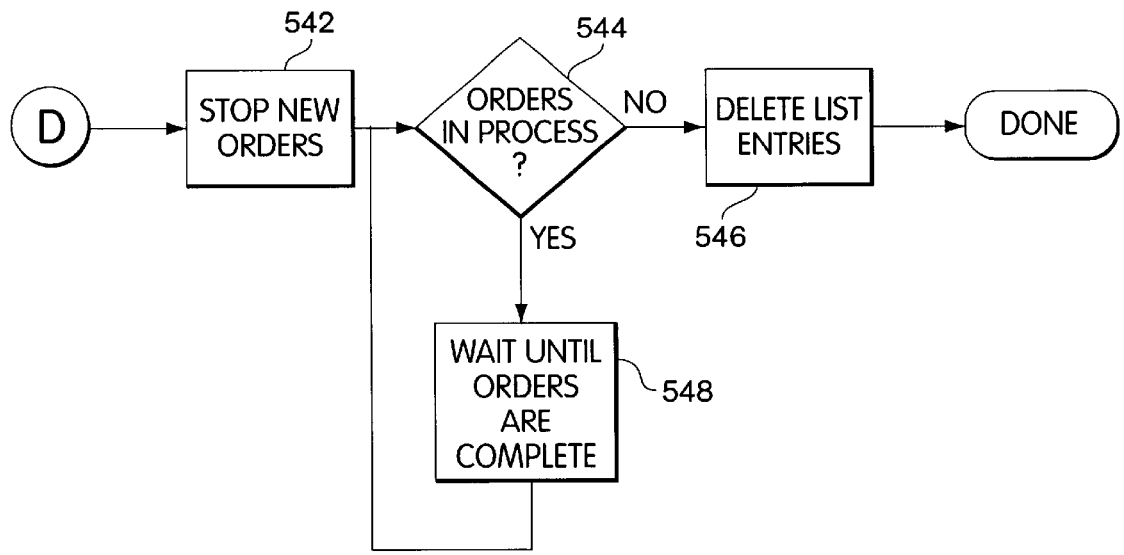
FIG. 20 is a flowchart illustrating a method of removing prospect lists from the database of prospect lists of the present invention.

The prospect list system includes a process of removing lists from the catalog and database of the process list system, as illustrated in FIG. 20. Upon receipt of instructions from the list manager to remove a prospect list from the catalog and database, the prospect list system stops all new orders for the prospect list from list purchasers, step 542. Suspending new orders prevents a list purchaser from ordering the prospect list to be deleted.

The prospect list system then determines if there are any outstanding orders for the prospect list from list purchases, step 544. If the prospect list system determines that there are orders in process, the system waits until the orders are complete before proceeding, step 548. If the system determines that no orders are in process, the system proceeds with deleting the prospect list from the catalog and the prospect list database, step 546.

Prospect List Loading Process

Figure 21:
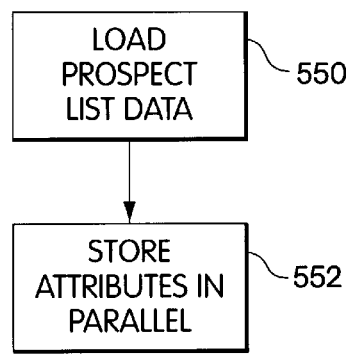
FIG. 21 is a flowchart illustrating a method of loading prospect list data into the database of prospect lists of the present invention.

FIG. 21 illustrates a process of loading the prospect list and the data associated with the prospect list into the prospect list database 206. The prospect list data is initially loaded into the prospect list database and stored in an intermediate storage area of the database, step 550. From the intermediate storage area, each attribute, and the attribute data associated therewith, is stored in parallel into the prospect list database 206, step 552. In particular, each attribute is stored in an attribute data table for 416 and the attribute data is stored in one or more attribute-data data tables 418. (See FIG. 13). For example, the attribute "Bicycle Type" from the Bicycle Magazine List (Table 1) can be stored in an attribute table 416 and the data associated with the attribute, e.g., "Schwinn", Cannondale, etc." can be stored in one or more attribute-data data tables, step 418.

Storing the attributes of the prospect list in parallel in independent data tables, can also facilitate the deletion and modification of the attributes of a prospect list, as the prospect list system can delete and/or modify groups of attributes in parallel.

Distribution of Prospect Lists

A principal objective of the online prospect list system of the present invention is the distribution of highly targeted lists of prospective customers to list purchasers. Through the prospect list system, a list purchaser can create a list of prospective customers from the prospect lists stored in the prospect list database. A list purchaser has the option of creating a list of prospective customers through a catalog-based search of the prospect lists stored in the prospect list database or through an attribute-based search of the prospects from the prospects lists stored in the prospect list database. The prospect list system allows the list purchaser to create a list of prospective customers over the computer network using an interface provided by the prospect list system. Additionally, the prospect list systems provides a number of distribution options for the list of prospective customers ordered by the list purchaser.

Catalog-Based Distribution Process

The prospect list system provides a catalog of prospect lists available to list purchasers for creating a list of prospective customers. The catalog is preferably accessible to list purchasers over the computer network. For example, in an internet based system, the catalog can be accessible to list purchasers through a web page, preferably the home page, of the prospect list system. A site search engine can be provided, along with links to the catalog entries and list descriptions, to allow list purchasers to search or browse the catalog and catalog entries.

Figure 22:
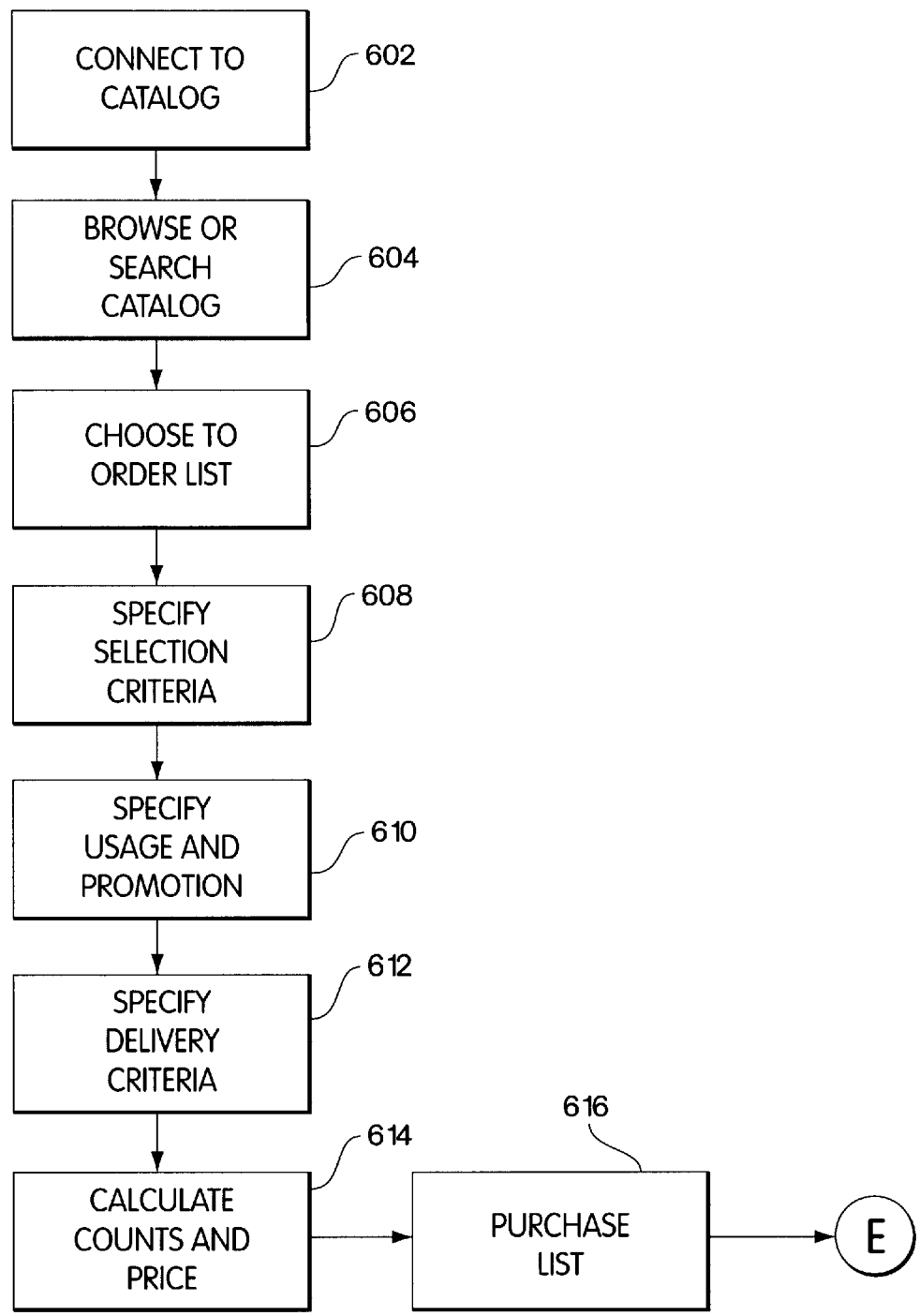
FIG. 22 is a flowchart illustrating a catalog-based method of distributing a list of prospective customers from the database of prospect lists of the present invention.

FIG. 22 illustrates a catalog-based method of distributing lists of prospective customers to a list purchaser. Initially, a list purchaser can access the prospect list system over the computer network and connect to the catalog of prospective list available from the system, step 602. In an internet based system, list purchasers can access the prospect list system via a client system and browser or other user interface for navigating the Internet.

The list purchaser can browse or search through the catalog entries and list descriptions provided by the catalog to identify prospect lists stored in the prospect list database that may be suitable to the list purchaser, step 604. The catalog can include catalog categories that organize prospect lists by specific criteria. Browsing the catalog can include drilling down from high-level categories to low-level categories until a suitable prospect list is identified by the list purchaser. Searching can be performed by entering search criteria and reviewing results until a suitable prospect list is found by the list purchaser.

Upon identifying a suitable prospect list or prospect lists, the list purchaser can choose to order prospective customers from the identified prospect lists, step 606. The prospect list system provides an interface having controls whereby one or more lists purchaser can select prospective customers from the prospect list database. The control may include code for rendering a control, or may specific any form of control that may be handled by the list purchaser, and may include, for example, a test box, a radio button, a drop-down list, or one or more checkboxes, a scroll box, a slider, a dial, and the like. While use of these controls is known for, for example, window clients, other custom controls or physical or graphical user interface controls may be defined for list purchasers and used according to the principals of the invention.

Upon identifying prospect lists for purchase, the prospect list system requests the list purchaser to specify additional selection criteria. Using the interface controls, the list purchaser can optionally select additional selection criteria, such as the attributes associated with the identified prospect lists, to further target the list of prospective customers, step 608.

The prospect list system can solicit from the list purchaser the list purchaser's intended use of the ordered list of prospective customers, as well as, a sample of the marketing or other material to be provided to the prospective customers, step 610. The usage information and the promotional material can be provided by the list purchaser using the interface controls of the prospect list system. As discussed above, list managers may request usage information prior to granting approval for the distribution of a prospect list. Usage information can be provided in a narrative form and can specify other information such as if the prospective customers are being used as a test or control group. For mailing and email promotions, the promotional sample can be a copy of all or a portion of the promotional material intended to be sent to the prospective customers. For telemarketing, a script of the telemarketing offer can be provided as the offer sample. The usage information and promotional sample can be archived by the prospect list system for later analysis of the success of the marketing.

The prospect list system can request the list purchaser to specify the delivery criteria for the list of prospective customers. Using the interface controls, the list purchaser can specify the delivery criteria to the prospect list system, step 612. As discussed above, a list manager can provide usage instructions that limit the method of delivery of the prospect list to list purchasers. The prospect list service presents the delivery options for the identified prospect list to the list purchasers. Delivery options can include direct delivery to the list purchaser or delivery through a third party. As discussed below, direct delivery to the list purchaser can be achieved by downloading the prospective customers to the client system of the list purchaser or, alternatively, by storing the list of prospective customers on a storage medium suitable for delivery to the list purchaser. Exemplary storage media can include printed materials, such as mailing labels, or computer readable storage media. The list of prospective customers can be delivered to the list purchaser using contact information solicited from the list purchaser by the prospective list system.

Third party delivery options include delivering the list of prospective customers to a contact service provider, such as a mail house, telemarketer, or email service. The prospect list service can provide a list of contact service providers for the list purchaser to select from. The contact service provider receives the list of prospective customers from the prospect list system and contacts the prospective customers on behalf of the list purchaser. Another third party delivery option includes delivering the list of prospective customers to a fulfillment center for storing the list of prospective customers in a storage medium and delivering the storage medium to the list purchaser.

The prospect list system can calculate the number of prospective customers on the list of prospective customers and the price of the list to the list purchaser, step 614. The prospect list system determines the number or count of prospect records in the prospect list database that meets the criteria selected by the list purchaser. Pricing of the list of prospective customers can be based on the pricing scheme provided by the list manager or list managers corresponding to the selected prospect lists.

The prospect list system transmits the price and count of the list of the prospective customers to the list purchaser. Using the interface control, the list purchaser can choose to purchase the list of prospective customers, step 616. Upon completion of the purchase transaction, the prospect list system begins the process of fulfilling the order, as described below.

Attribute-Based Distribution Process

Figure 23:
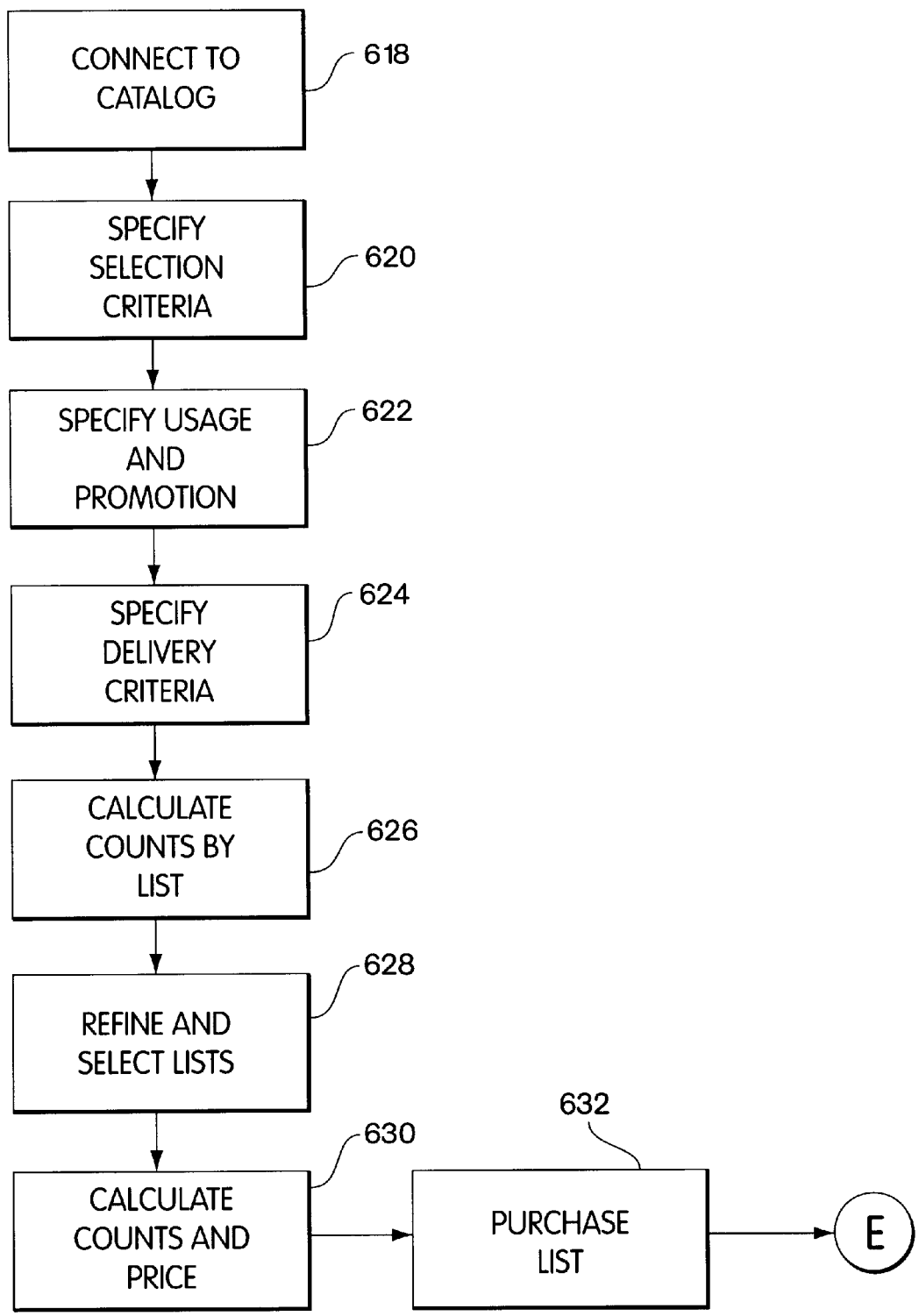
FIG. 23 is a flowchart illustrating an attribute-based method of distributing a list of prospective customers from the database of prospect lists of the present invention.

The prospect list service also provides the list purchaser with the option of creating a list of prospective customers based on the attributes of the prospect lists stored in the database. FIG. 23 illustrates an attribute-based process of distributing a list of prospective customers to a list purchaser.

Initially, the list purchaser connects to the prospect list system and the catalog of prospect lists available on the prospect list database, step 618. The list purchaser can select either a catalog-based search or an attribute-based search to create a list of prospective customers.

Upon the selection of the attribute-based search option, the prospect list system prompts the list purchaser to identify the search criteria or attributes for the attribute-based search, step 620. Using the interface controls the list purchaser can specify the search criteria or attributes to the prospect list system.

The prospect list system, requests the list purchaser to provide use and promotion information, step 622, and specify the delivery criteria for the list of prospective customers, step 624, as described above.

The prospect list system calculates the number of records or counts meeting the criteria specified by the list purchaser and identifies the prospect lists corresponding to each count, step 626. The list purchaser is presented with a list of prospect lists containing counts meeting the specified criteria. The prospect list system can specify the number of counts for each prospect list on the list.

The prospect list system provides the list purchaser the opportunity to refine the search criteria after receiving the search results. The list purchaser, using the interface controls, can specify additional criteria, or can choose to narrow the search to one or more of the identified prospect lists provided by the prospect list service, step 628. If the list purchaser does not narrow the prospect lists identified, the prospect list systems can use, by default, all identified prospect lists.

The prospect list system can calculate the counts and the price of the list of prospective customers, step 630, and the list purchaser can choose to purchase the list, step 632, as described above. Upon completion of the purchase transaction the prospect list system proceeds to fulfill the order, as described below.

Order Fulfillment Process

Figure 24:
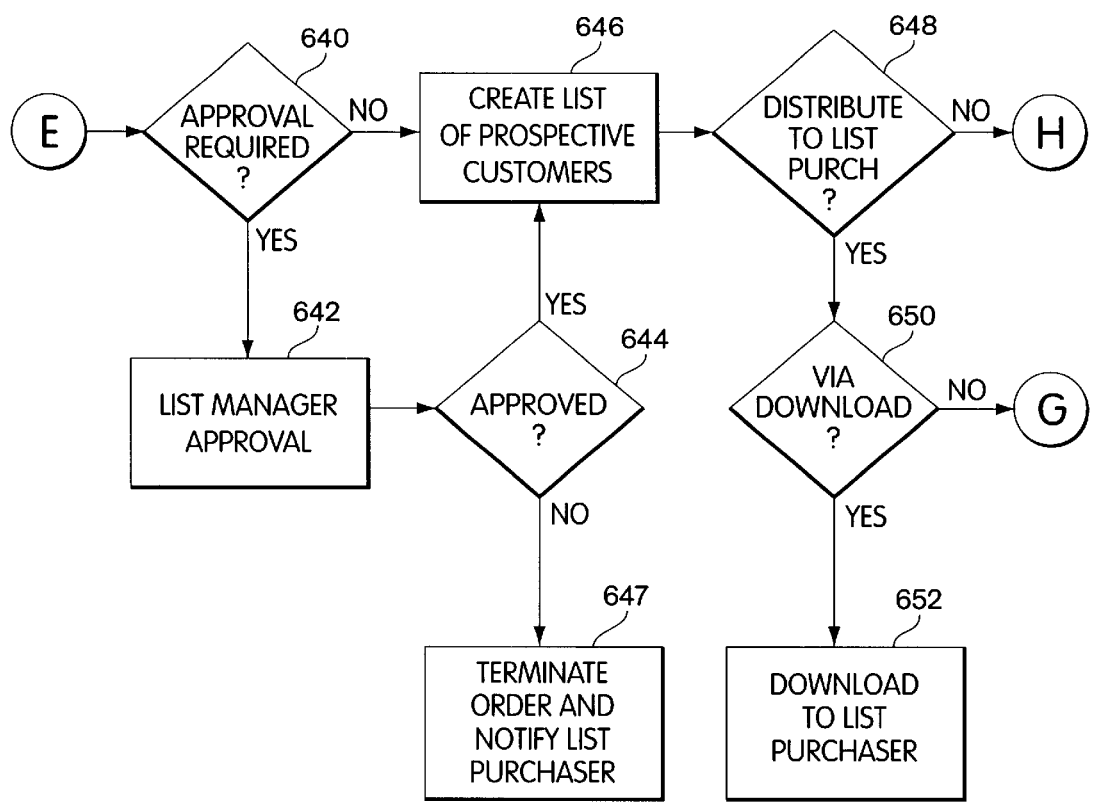
FIG. 24 is a flowchart illustrating a method of fulfilling an order for a list of prospective customers from the database of prospect lists of the present invention.

A final step in the distribution of a list prospective customers is the fulfillment of an order from a list purchaser. A fulfillment process includes providing access to the list of prospective customers to the list purchaser by delivering the list of prospective customers to the list purchaser directly, or through a third party, or delivering the list of prospective customers to a third party for contacting the prospective customers on behalf of the list purchaser. The fulfillment process is described below in connection with FIGS. 24–26.

Upon completion of the list purchaser transaction, the prospect list system determines if the list manager or list managers of the ordered prospect lists require approval prior to distribution of the prospect list to the list purchaser, step 640. If list manager approval is required, the prospect list system transmits the usage and promotional information provided by the list purchaser to the list manager for review, step 642. The list purchase system solicits list manager approval before proceeding with the fulfillment process, step 644. If the list manager approves distribution of the prospect lists to the list purchaser, the prospect list system creates a list of prospective customers, step 646, in accordance with the list creation process described below. If the list manager does not approve distribution of the prospect list to the list purchaser, the prospect list system terminates the order and notifies the list purchase, step 647.

If the prospect list system determines that list manager approval is not required, the prospect list system proceeds with the process of creating the list of prospective customers, step 646, as described below.

Upon completion of the list creation process, the prospect list system distributes the list of prospective customers to the list purchaser in accordance with the delivery method selected by the list purchaser. Initially, the prospect list system identifies the distribution option selected by the list purchaser, step 648. If the delivery option selected is distribution of the list of prospective customers to a third party, such as a contact service provider, the prospect list system begins distribution to the contract service provider, as described below in connection with FIG. 26.

If the list delivery option selected by the list purchaser includes delivery to the list purchaser, the prospect list system identifies whether the list of prospective customers is to be delivered directly to the list purchaser, preferably by downloading the list from the prospect list service, or whether the list of prospective customers is to be delivered to the list purchaser through a third party, step 650. If the list of prospective customers is to be delivered directly to the list purchaser, the prospect list system can download the list of prospective customers over the computer network to the client system of the list purchaser, step 652. If the list of prospective customers is to be delivered through a third party, the prospect list service proceeds with distributing the list to the third party, as described below in connection with FIG. 25.

Figure 25:
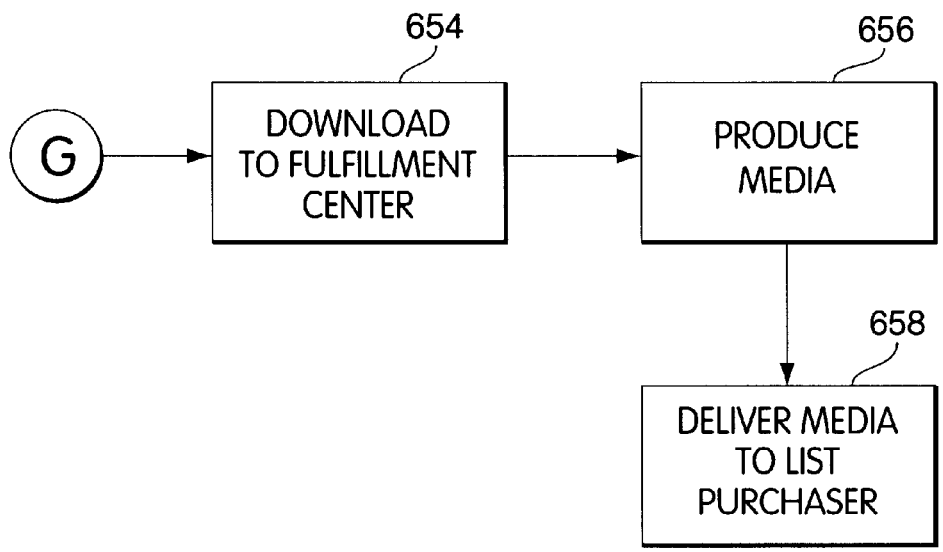
FIG. 25 is a flowchart illustrating a method of a delivering a list of prospective customers to list purchaser through a third-party fulfillment center.

Referring to FIG. 25, a method of delivering a list of prospective customers to a list purchaser through a third party is illustrated. Initially, the prospect list system delivers the list of prospective customers to the third party, such as a fulfillment center, step 654. Preferably, the list of prospective customers is downloaded over the computer network to a client system of the fulfillment center, although other delivery methods can be employed without departing from the scope of the present invention. A third party fulfillment center stores the list of prospective customers on a storage media, step 656. The storage media can be printed media, such as mailing labels, or can be computer readable storage media. Upon completion of the storage process, the storage media is delivered to the list purchaser, step 658.

Figure 26:
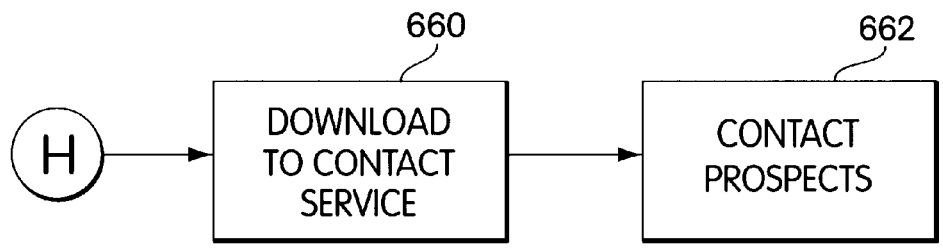
FIG. 26 is a flowchart illustrating a method of a contacting a list of prospective customers on behalf of a list purchaser.

FIG. 26 illustrates a method of delivering the list of prospective customers to a third party for contacting the prospective customers on behalf of the list purchaser. Initially, the prospect list system delivers the list of prospective customers to a third party, such as a contact service provider, step 660. A contact service provider can be a mail house, a telemarketer, an email service, or other service for contacting prospective customers. Upon receiving the list of prospective customers, the contact service proceeds with contacting the prospective customers on behalf of the list purchaser, step 662.

List Creation Process

A principal part of the order fulfillment process is the creation of the list of prospective customers from the prospect lists stored in the prospect list database based on the criteria specified by the list purchaser. Creation of the list of prospective customers can be realized using the database system that stores and manages the prospect list database. The list creation process described below in connection with FIG. 27 can be invoked by the prospect list service for both catalog-based and attribute-based distribution methods.

Figure 27:
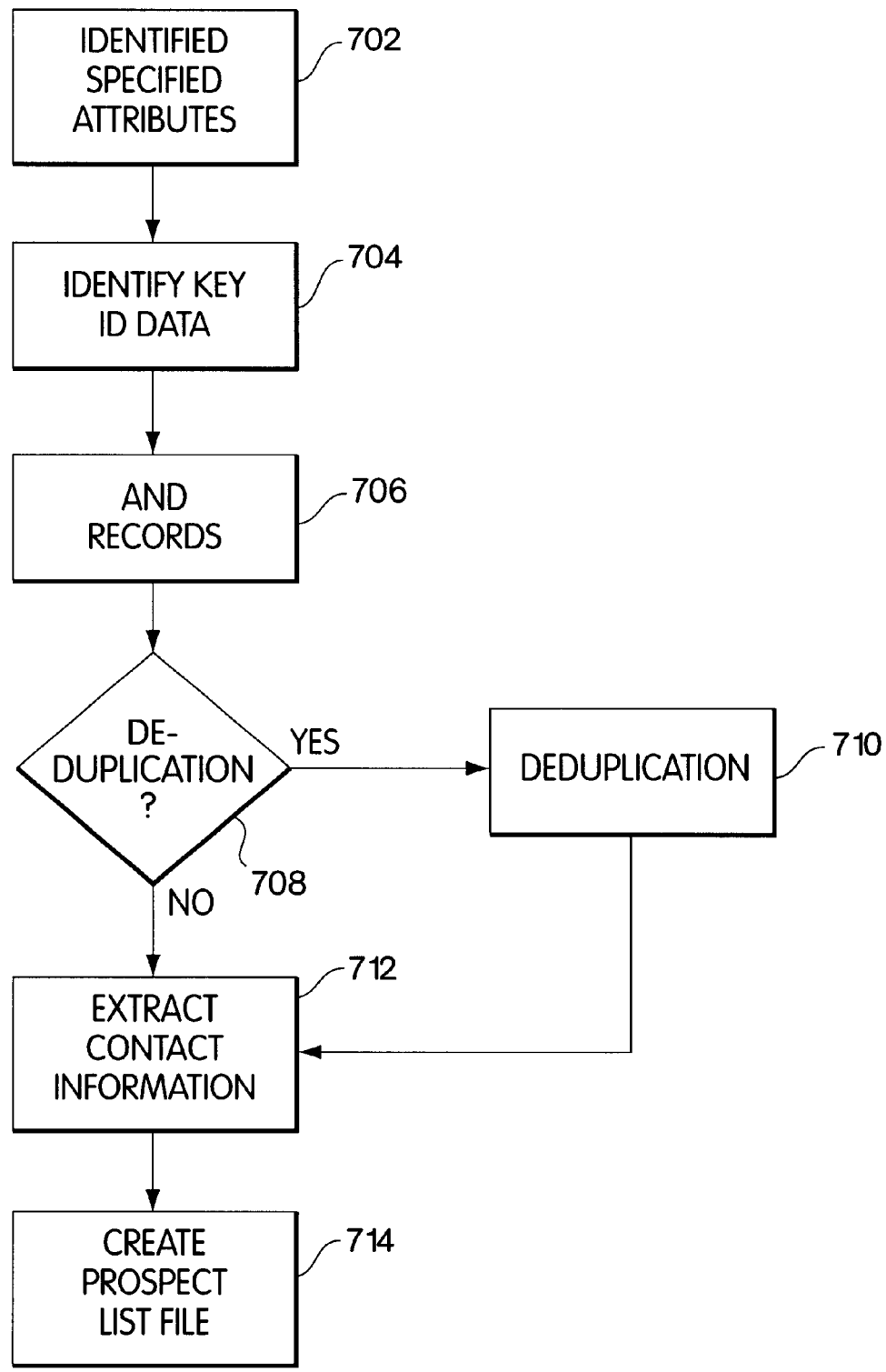
FIG. 27 is a flowchart illustrating a method of a creating a list of prospective customers from the database of prospect lists of the present invention.

FIG. 27 illustrates a method of creating a list of prospective customers from the database from prospects list. Initially, the prospect list system selects records, i.e., attributes and corresponding attribute data, from the database tables provided in the list selection data section 406 of the prospect list database, step 702. Using the database system, the prospect list system searches the data tables in the contact info. selects subsection 426 and the custom attributes subsection 428 for attributes and attribute data corresponding to the criteria selected by the list purchaser. Searching the data tables can be facilitated by searching based on the integer values assigned to the attributes and the attribute data. Generally, a database system can search for an integer value faster than a non-integer value. For this reason, the ID keys assigned to the attributes and the lists are preferably integer values.

The prospect list system identifies the key ID data associated with each record meeting the selection criteria, step 704. The prospective list system can thus identify the attribute ID and the list ID of each attribute corresponding to the specified criteria.

The prospect list system merges or adds together the records meeting the specified criteria, step 706. Merging results in a set of list IDs, attribute IDs, and corresponding attribute data values that meet the specified criteria.

The prospect list system then determines whether or not the merged list requires de-duplication, step 708. De-duplication involves identifying and removing prospects that appear more than once on the merged list. De-duplication may not be necessary if the list purchaser has selected prospects from only one prospect list available in the prospect list database. If de-duplication is not necessary, the prospect list system proceeds with extracting the contact information for the prospects identified on the merged list, step 712.

If de-duplication is necessary, the prospect list system identifies the known party ID for each attribute/attribute value combination contained in the list. The prospect list system produces one known party ID for each prospect contained in the merged list.

Upon completion of the de-duplication process, the prospective list system proceeds with extracting contact information for each prospect identified on the list, step 712.

Once the contact information is extracted, the prospect list service creates a file storing the list of prospective customers, step 714.

One skilled in the art will appreciate that the order of each of the steps of each the preferred methods and process described herein may be varied without departing from the scope of the present invention. In addition, one skilled in the art will recognize that the exemplary organization of the steps for the methods and processes described herein can varied, as one or more steps may be combined into a single step and/or single steps can be divided into multiple steps, without departing from the scope of the present invention.

The online prospect list service of the present invention can also optionally include a system for enabling a prospect to track and control information stored in a prospect list database concerning the prospect. Such a privacy control system is described in commonly-owned U.S. patent application Ser. No. 09/662,362, entitled System for Enabling Privacy Control In a Prospect List Database, filed concurrently herewith. The aforementioned patent application is incorporated herein by reference.

Since certain changes may be made in the above constructions without departing from the scope of the invention. It is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

Having described the invention, what is claimed as new and desired to be secured by Letters Patent is:

1. A method of storing a prospect list, the method comprising:
    providing a server computer hosting a prospect list service accessible via client computers to a plurality of prospect list managers and a plurality of list purchasers;
    providing a database of information concerning prospect lists available from a plurality of list managers;
    providing a prospect list service including a user interface comprising controls whereby at least one of a list manager and a list purchaser can access information concerning prospect lists stored in the database, the prospect list service being available via a computer network to assist a list manager in offering a prospect list for sale to a plurality of list purchasers and to assist a list purchaser in selecting and purchasing a list of prospects from a list manager;
    receiving a prospect list for storage in the database, the prospect list including one or more attributes for characterizing the prospective customers on the list, each prospective customer on the list having attribute data for one or more of the attributes included in the prospect list;
    assigning an unique attribute ID to each attribute associated with the prospect list; and
    storing each attribute and associated attribute data in the database.

2. The method of claim 1, further comprising:
    dividing one or more attributes into pre-defined component attributes.

3. The method of claim 1, further comprising:
    transforming data for one or more attributes into a standard format, the standard format being pre-defined by the computer database.

4. The method of claim 1, further comprising:
    adding geographic data to a prospective customer included on the prospect list, the geographic data identifying the geographic location of the residence of the prospective customer.

5. The method of claim 4, wherein the geographic data identifies the latitude, longitude zip code, or Metropolitan Statistical Area (MSA) of the prospective customer's residence.

6. The method of claim 1, further comprising assigning an unique list ID to the prospect list.

7. The method of claim 1, further comprising: assigning a unique attribute data ID to each data value corresponding to each attribute associated with the prospect list.

8. The method of claim 7, wherein the unique attribute data ID is an integer.

9. The method of claim 1, further comprising:
    comparing attribute data for an attribute of the list with existing attribute data stored on the database.

10. The method of claim 9, wherein the compared attribute data identifies the respective prospective customer associated with the compared attribute value.

11. The method of claim 9, wherein the compared attribute data is at least one of the name, address, and telephone number of the prospective customer associated with the compared attribute value.

12. The method of claim 9, further comprising:
    assigning a known party ID to the prospective customer associated with the compared attribute data and the existing attribute data, if the compared attribute data substantially matches the existing attribute data.

13. The method of claim 1, wherein each attribute is loaded in parallel into the database.

* * * * *